(12) United States Patent
Lundström

(10) Patent No.: US 7,532,214 B2
(45) Date of Patent: May 12, 2009

(54) AUTOMATED MEDICAL IMAGE VISUALIZATION USING VOLUME RENDERING WITH LOCAL HISTOGRAMS

(75) Inventor: Claes F. Lundström, Rimforsa (SE)

(73) Assignee: Spectra AB, Linkoping (SE)

( * ) Notice: Subject to any disclaimer, the term of this patent is extended or adjusted under 35 U.S.C. 154(b) by 283 days.

(21) Appl. No.: 11/137,160

(22) Filed: May 25, 2005

(65) Prior Publication Data

US 2007/0008317 A1    Jan. 11, 2007

(51) Int. Cl.
G06K 9/00 (2006.01)
G06K 9/34 (2006.01)
G06K 9/38 (2006.01)
G06T 17/00 (2006.01)

(52) U.S. Cl. ................ 345/424; 382/168; 382/169; 382/171; 382/172; 382/128; 382/130; 382/131; 382/132; 382/154

(58) Field of Classification Search ......... 382/168–172, 382/128–134, 154; 345/424
See application file for complete search history.

(56) References Cited

U.S. PATENT DOCUMENTS

| | | | | |
|---|---|---|---|---|
| 4,856,528 A * | 8/1989 | Yang et al. | ................ | 382/131 |
| 5,113,357 A | 5/1992 | Johnson et al. | ............ | 345/424 |
| 5,381,518 A * | 1/1995 | Drebin et al. | ............... | 345/424 |
| 5,410,250 A * | 4/1995 | Brown | ........................ | 324/309 |
| 5,457,754 A * | 10/1995 | Han et al. | .................... | 382/128 |
| 5,861,891 A | 1/1999 | Becker | ...................... | 345/619 |
| 5,917,937 A | 6/1999 | Szeliski et al. | ............. | 382/154 |
| 5,930,803 A | 7/1999 | Becker et al. | ............. | 707/104.1 |
| 5,960,435 A | 9/1999 | Rathmann et al. | ........... | 707/101 |
| 5,986,662 A | 11/1999 | Argiro et al. | ................ | 345/424 |
| 6,008,813 A | 12/1999 | Lauer et al. | ................. | 345/424 |
| 6,026,399 A | 2/2000 | Kohavi et al. | .................. | 707/6 |
| 6,034,697 A | 3/2000 | Becker | ....................... | 345/606 |
| 6,078,332 A | 6/2000 | Ohazama | .................... | 345/426 |
| 6,137,499 A | 10/2000 | Tesler | ......................... | 345/440 |
| 6,166,742 A | 12/2000 | He | ............................. | 345/421 |
| 6,182,058 B1 | 1/2001 | Kohavi | ....................... | 706/45 |
| 6,191,789 B1 | 2/2001 | Yamato et al. | ............. | 345/424 |
| 6,191,791 B1 | 2/2001 | Dyer et al. | ................. | 345/581 |
| 6,219,059 B1 | 4/2001 | Argiro | ........................ | 345/424 |

(Continued)

FOREIGN PATENT DOCUMENTS

WO    WO2005/104037 A2    11/2005

OTHER PUBLICATIONS

Konig, Andreas H.; Groller, Eduard M.; "Mastering Transfer Function Specification by using VolumePro Technology;" 1999; Real Time Visualization, Inc; pp. 1-7.*

(Continued)

*Primary Examiner*—Ulka Chauhan
*Assistant Examiner*—Crystal Murdoch
(74) *Attorney, Agent, or Firm*—Myers, Bigel, Sibley & Sajovec, P.A.

(57) ABSTRACT

Methods and apparatus are configured to provide data to render (medical) images using direct volume rendering by electronically analyzing a medical volume data set associated with a patient that is automatically electronically divided into a plurality of local histograms having intensity value ranges associated therewith and programmatically generating data used for at least one of tissue detection or tissue classification of tissue having overlapping intensity values.

24 Claims, 13 Drawing Sheets
(4 of 13 Drawing Sheet(s) Filed in Color)

U.S. PATENT DOCUMENTS

| | | | |
|---|---|---|---|
| 6,219,061 B1 | 4/2001 | Lauer et al. | 345/424 |
| 6,259,451 B1 | 7/2001 | Tesler | 345/419 |
| 6,261,233 B1* | 7/2001 | Kantorovich | 600/454 |
| 6,262,740 B1 | 7/2001 | Lauer et al. | 345/424 |
| 6,278,459 B1 | 8/2001 | Malzbender et al. | 345/424 |
| 6,278,464 B1 | 8/2001 | Kohavi et al. | 345/440 |
| 6,301,579 B1 | 10/2001 | Becker | 707/102 |
| 6,373,483 B1 | 4/2002 | Becker et al. | 345/419 |
| 6,407,737 B1 | 6/2002 | Zhao et al. | 345/424 |
| 6,460,049 B1 | 10/2002 | Becker et al. | 707/104.1 |
| 6,480,194 B1 | 11/2002 | Sang'udi et al. | 345/440 |
| 6,539,127 B1* | 3/2003 | Roche et al. | 382/294 |
| 6,556,696 B1 | 4/2003 | Summers et al. | 382/131 |
| 6,559,843 B1 | 5/2003 | Hsu | 345/421 |
| 6,585,647 B1 | 7/2003 | Winder | 600/437 |
| 6,647,283 B2* | 11/2003 | Klotz | 600/425 |
| 6,664,961 B2 | 12/2003 | Ray et al. | 345/424 |
| 6,674,430 B1 | 1/2004 | Kaufman et al. | 345/419 |
| 6,694,163 B1* | 2/2004 | Vining | 600/407 |
| 6,711,288 B2* | 3/2004 | Kim et al. | 382/165 |
| 6,714,195 B1 | 3/2004 | Ezra et al. | 345/423 |
| 6,771,262 B2* | 8/2004 | Krishnan | 345/424 |
| 6,771,263 B1 | 8/2004 | Behrens et al. | 345/424 |
| 6,798,412 B2 | 9/2004 | Cowperthwaite | 345/428 |
| 6,801,215 B1 | 10/2004 | Silva et al. | 345/629 |
| 6,806,705 B2 | 10/2004 | van Muiswinkel et al. | 324/307 |
| 6,842,176 B2 | 1/2005 | Sang'udi et al. | 345/440 |
| 6,961,463 B1* | 11/2005 | Loui et al. | 382/170 |
| 6,967,653 B2* | 11/2005 | Wittenbrink et al. | 345/440 |
| 6,990,222 B2* | 1/2006 | Arnold | 382/131 |
| 7,079,140 B2* | 7/2006 | Boehler et al. | 345/440 |
| 7,110,591 B2* | 9/2006 | Neubauer et al. | 382/147 |
| 7,123,763 B2* | 10/2006 | Shinbata | 382/132 |
| 7,333,656 B2* | 2/2008 | Takarada | 382/169 |
| 2001/0031920 A1 | 10/2001 | Kaufman et al. | 600/431 |
| 2002/0028006 A1* | 3/2002 | Novak et al. | 382/128 |
| 2002/0028008 A1* | 3/2002 | Fan et al. | 382/131 |
| 2002/0081006 A1* | 6/2002 | Rogers et al. | 382/128 |
| 2002/0183606 A1* | 12/2002 | Boehler et al. | 600/407 |
| 2002/0191827 A1* | 12/2002 | Armato et al. | 382/131 |
| 2003/0009098 A1* | 1/2003 | Jack et al. | 600/410 |
| 2003/0048936 A1* | 3/2003 | Fan et al. | 382/131 |
| 2003/0053668 A1* | 3/2003 | Ditt et al. | 382/128 |
| 2003/0095696 A1* | 5/2003 | Reeves et al. | 382/131 |
| 2003/0105395 A1* | 6/2003 | Fan et al. | 600/425 |
| 2003/0176780 A1* | 9/2003 | Arnold et al. | 600/407 |
| 2003/0223627 A1* | 12/2003 | Yoshida et al. | 382/128 |
| 2004/0001632 A1* | 1/2004 | Adachi | 382/224 |
| 2004/0013292 A1* | 1/2004 | Raunig | 382/128 |
| 2004/0062429 A1* | 4/2004 | Kaufhold | 382/132 |
| 2004/0064038 A1* | 4/2004 | Bruder et al. | 600/425 |
| 2004/0101179 A1* | 5/2004 | Suryanarayanan et al. | 382/128 |
| 2004/0170247 A1* | 9/2004 | Poole et al. | 378/4 |
| 2004/0184647 A1* | 9/2004 | Reeves et al. | 382/131 |
| 2004/0210130 A1* | 10/2004 | Prince | 600/420 |
| 2004/0259065 A1* | 12/2004 | Geiger | 434/272 |
| 2005/0002548 A1* | 1/2005 | Novak et al. | 382/128 |
| 2005/0017972 A1* | 1/2005 | Poole et al. | 345/424 |
| 2005/0113679 A1* | 5/2005 | Suryanarayanan et al. | 600/425 |
| 2005/0113680 A1* | 5/2005 | Ikeda et al. | 600/425 |
| 2005/0119555 A1* | 6/2005 | Fritz et al. | 600/410 |
| 2005/0129274 A1* | 6/2005 | Farmer et al. | 382/103 |
| 2005/0207630 A1* | 9/2005 | Chan et al. | 382/131 |
| 2006/0066628 A1* | 3/2006 | Brodie et al. | 345/594 |
| 2006/0078182 A1* | 4/2006 | Zwirn et al. | 382/128 |
| 2006/0088198 A1* | 4/2006 | Arnold | 382/131 |
| 2006/0094954 A1* | 5/2006 | Fan et al. | 600/425 |
| 2007/0013696 A1* | 1/2007 | Desgranges et al. | 345/426 |
| 2007/0014472 A1* | 1/2007 | Ying et al. | 382/170 |
| 2007/0019849 A1* | 1/2007 | Kaufman et al. | 382/128 |

OTHER PUBLICATIONS

Drebin, Robert A.; Carpenter, Loren; Hanrahan, Pat; "Volume Rendering;" Aug. 1988; ACM Computer Graphics, vol. 22, No. 4, pp. 65-74.*

"Adobe® Photoshop® 6.0;" 2000 Adobe Systems, pp. 16-17hi'.*

Beveridge, J. R.; Griffith, J.; Kohler, R.; Hanson, A.; Riseman, E.; "Segmenting Images Using Localized Histograms and Region Merging;" 1989; International Journal of Computer Vision; pp. 311-347.*

Yoshida, H.; "Three-Dimensional Computer-Aided Diagnosis Scheme for Detection of Colonic Polyps;" Dec. 2001; IEEE Transactions on Medical Imaging; vol. 20, No. 12; pp. 1261-1274.*

Andriole, K.P., *Addressing the Coming Radiology Crisis: The Society for Computer Applications in Radiology Transforming the Radiological Interpretation Process* (TRIP™) *Initiative*, A position paper from the Scar Trip™ subcommittee. http://www.scarnet.org/pdf/2TRIPwhitepaper103.pdf, Nov. 2003.

Bajaj et al., *The Contour Spectrum*, In Proceedings IEEE Visualization, pp. 167-173, (1997).

He et al., *Generation of transfer functions with stochastic search techniques*, In Proceedings IEEE Visualization, pp. 227-234, (1996).

Hladuvka, J. et al., *Curvature-based transfer functions for direct volume rendering*, In Proceedings Spring Conference Computer Graphics 2000, vol. 16, pp. 58-65, (2000).

Kindlemann, G. et al., *Curvature-based transfer functions for direct volume rendering: Methods and applications*, IEEE Visualization 2003, pp. 513-520, (2003).

Kindlmann, G. et al., *Semi-automatic generation of transfer functions for direct volume rendering*, In Proceedings IEEE Symposium on Volume Visualization, pp. 79-86, (1998).

Kniss, J. et al., *Multidimensional transfer functions for interactive volume rendering*, IEEE Transactions on Visualization and Computer Graphics, vol. 8, No. 3, pp. 270-285, (2002).

Konig, A.H. et al., *Mastering transfer function specification by using VolumePro technology*, In Proceedings Spring Conference Computer Graphics 2001, vol. 17, pp. 279-286, (2001).

Laidlaw, D. et al., *Partial-volume Bayesian classification of material mixtures in MR volume data using voxel histograms*, IEEE Transactions on Medical Imaging, vol. 17, No. 1, pp. 74-86, (1998).

Levoy, M. et al., *Volume Rendering, Display of surfaces from volume data*, IEEE Computer Graphics and Applications, vol. 8, No. 5, pp. 29-37, (1988).

Ljung, P. et al., *Transfer function based adaptive decompression for volume rendering of large medical data sets*, In Proceedings IEEE Volume Visualization and Graphics Symposium, pp. 25-32, (2004).

Lum, E.B. et al., *Lighting transfer functions using gradient aligned sampling*, IEEE Visualization 2004, pp. 289-296, (2004).

Lundstrom et al., *Extending and Simplifying Transfer Functin Design in Medical Volume Rendering Using Local Histograms*, Eurographics-IEEE VGTC Symposium on Visualization, 8 pages, (Jun. 2005).

Maragos, P. et al., *Morphological systems for multidimensional signal processing*, Proceedings of the IEEE, vol. 78, No. 4, pp. 690-710, (1990).

Marks, J. et al., *Design galleries: A general approach to setting parameters for computer graphics and animation*, In Proceedings SIGGRAPH 1997, pp. 389-400, (1997).

Nyul et al., *On standardizing the MR Image Intensity Scale*, Magnetic Resonance in Medicine 42:1072, pp. 1072-1081, (1999).

Pfister, H. et al., *The transfer function bake-off*, In Proceedings of the IEEE Visualization 2001, pp. 16-22, (2001).

Sato, Y. et al., *Tissue classification based on 3D local intensity structures for volume rendering*, IEEE Transactions on Visualization and Computer Graphics, vol. 6, No. 2, pp. 160-179, (2000).

Tzeng, F.Y. et al., *A novel interface for higher-dimensional classification of volume data*, In Proceedings IEEE Visualization 2003, pp. 505-512, (2003).

Zoroffi, R.A. et al., *Automated segmentation of acetabulum and femoral head from 3-D CT images*, IEEE Transactions on Information Technology in Biomedicine, vol. 7, No. 4, pp. 329-343, (Dec. 2003).

*Volume Rendering Overview*, http://www.tgs.com/pro_div/vol_render_overview.htm, 3 Sheets, Copyright TGS 2004.

*Announcement of 7th Symposium, Eurographics/IEEE VGTC Symposium on Visualization*, (scheduled for Jun. 1-3, 2005) http://www.comp.leeds.ac.uk/eurovis/index.html, 2 sheets, believed to be Dec. 2004.

Lundstrom et al. "Extending and Simplfying Transfer Function Design in Medical Volume Rendering Using Local Histograms" *Eurographics—IEEE VGTC Suymposium o Visualization* (2005).

* cited by examiner

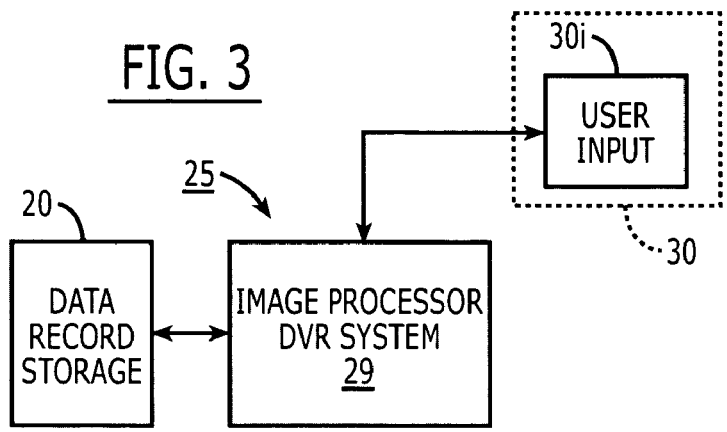

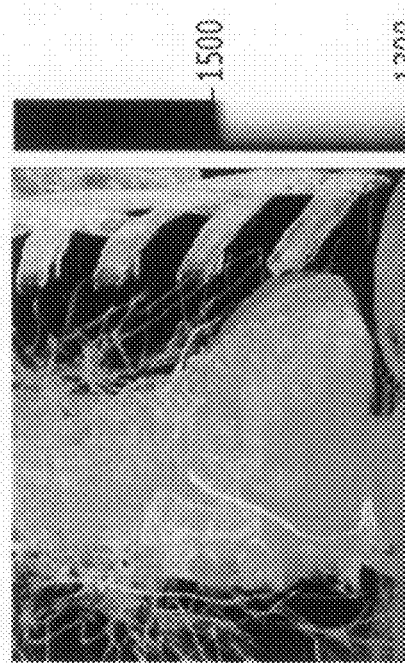
FIG. 15A
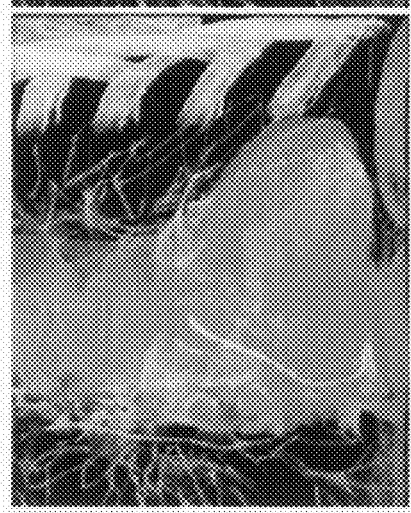
FIG. 16A
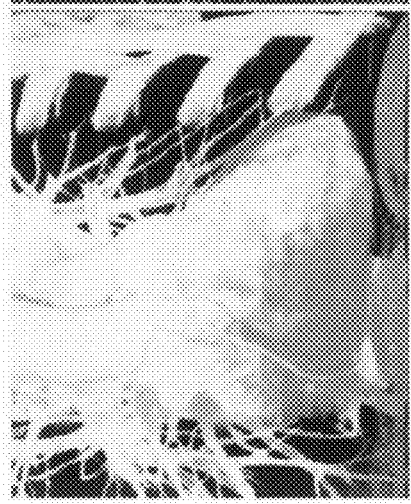
FIG. 17A
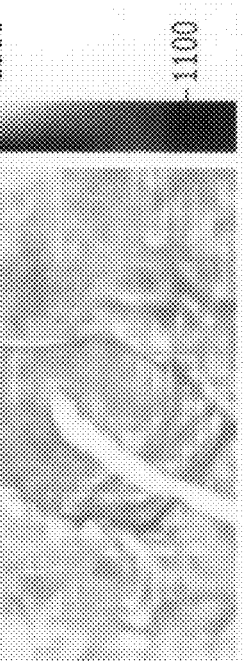
FIG. 15B
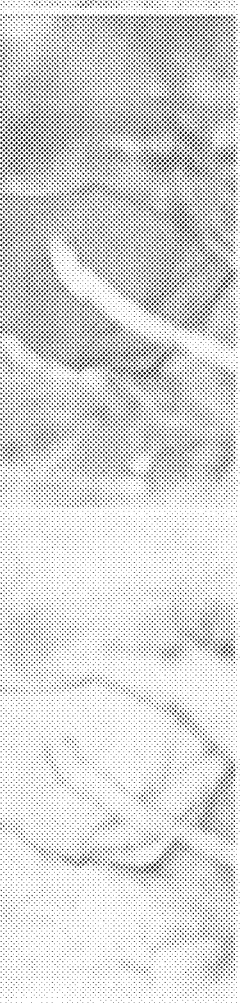
FIG. 16B
FIG. 17B

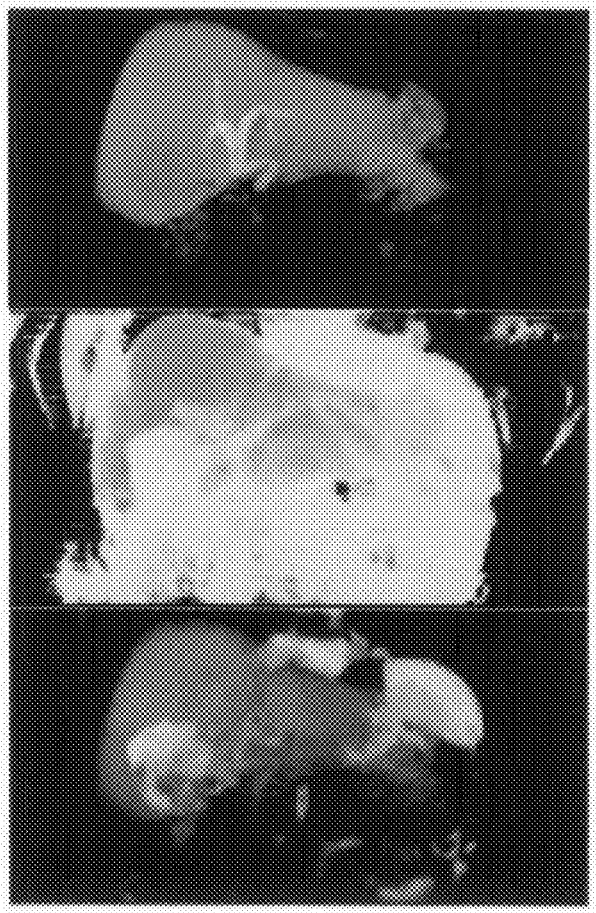
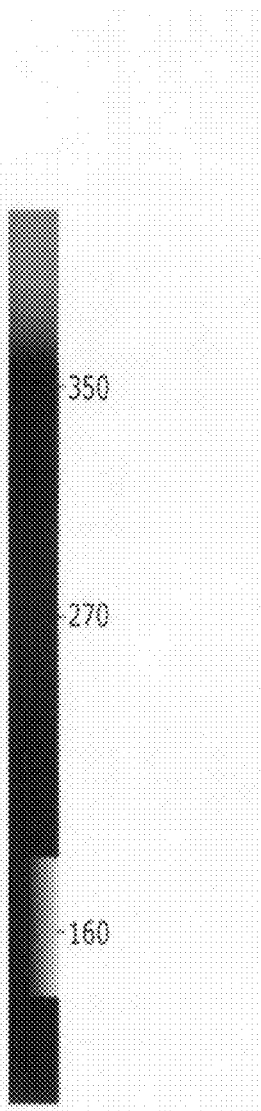
FIG. 18A
FIG. 18B
FIG. 18C

AUTOMATED MEDICAL IMAGE VISUALIZATION USING VOLUME RENDERING WITH LOCAL HISTOGRAMS

FIELD OF THE INVENTION

The present invention relates to medical renderings of imaging data.

RESERVATION OF COPYRIGHT

A portion of the disclosure of this patent document contains material to which a claim of copyright protection is made. The copyright owner has no objection to the facsimile or reproduction by anyone of the patent document or the patent disclosure, as it appears in the Patent and Trademark Office patent file or records, but reserves all other rights whatsoever.

BACKGROUND OF THE INVENTION

Direct Volume Rendering ("DVR") has been used in medical visualization research for a number of years. DVR can be generally described as rendering visual images directly from volume data without relying on graphic constructs of boundaries and surfaces thereby providing a fuller visualization of internal structures from 3-D data. DVR holds promise for its diagnostic potential in analyzing medical image volumes. Slice-by-slice viewing of medical data may be increasingly difficult for the large data sets now provided by imaging modalities raising issues of information and data overload and clinical feasibility with current radiology staffing levels. See, e.g., *Adressing the Coming Radiology Crisis: The Society for Computer Applications in Radiology Transforming the Radiological Interpretation Process (TRIP™) Initiative*, Andriole et al., at URL scarnet.net/trip/pdf/TRIP_White_Paper.pdf (November 2003). In some modalities, patient data sets can have large volumes, such as greater than 1 gigabyte, and can even commonly exceed 10's or 100's of gigabytes.

Despite its potential, DVR has not achieved widespread use for non-research medical imaging, particularly in computer network systems with visualization pipelines. This may be because DVR may need time-consuming manual adjustment using conventional transfer functions (TF) and/or editing tools. That is, the TF construction can be relatively complex and/or the tissue separation abilities may not be sufficient where dissimilar tissues have similar intensity values limiting the ability to generate diagnostic clinical renderings.

SUMMARY OF EMBODIMENTS OF THE INVENTION

Embodiments of the present invention are directed to methods, systems and computer program products that employ local histogram data that is used for direct volume renderings.

Some methods include evaluating data associated with direct volume renderings by automatically electronically analyzing a plurality of local histograms derived from a volume rendering data set, and programmatically generating data that is used for at least one of (a) material classification or (b) material detection, of materials in the data set, including materials of similar intensity, based on the analyzing step.

The methods may include distinguishing different materials with overlapping intensity values using range weight data values obtained from the electronic analysis of the local histograms. In particular embodiments, the methods may include electronically employing a statistical model of classification probability to classify whether a voxel in the volume rendering data set belongs to a feature and/or material of interest. The statistical model of classification probability may be based on weighted inputs of confidence for selected neighborhood characterizing features.

Other methods are directed to visualizing images of volume data sets in visualization systems. The methods include iteratively electronically subdividing a global histogram of a respective volume data set using partial local histograms having associated value ranges and intensity values to electronically automatically identify different materials, including materials having overlapping image intensity values.

In some embodiments, the methods can include adapting at least one a priori transfer function to evaluate different volume rendering data sets of similar examination types using programmatically generated partial range histograms of the local histogram data.

Other embodiments are directed to methods for providing a tissue exploration tool to allow a physician to interactively analyze medical volume data sets in a visualization system. The methods include: (a) allowing a user to electronically select a partial range of interest in an intensity scale of voxel data to thereby allow the user to interactively investigate voxels in a volume rendering data set; (b) electronically generating a partial range histogram associated with the selected partial range; and (c) electronically fitting an adaptive trapezoid to the partial range histogram to render an image of material associated with the selected partial range.

In some embodiments, the methods may also include disconnecting the trapezoid from a transfer function while a physician investigates different voxels.

Still other embodiments are directed to methods for visualizing images of volume data sets. The methods include: (a) iteratively electronically subdividing a respective volume data set using local histograms of neighborhood voxel data to allocate the neighborhoods of data into partial range histograms, each partial range histogram having voxels with intensity values in a defined range; and (b) electronically automatically identifying different materials in the volume data set, including materials having overlapping image intensity values which may be distributed over a target volume of interest.

In particular embodiments, the local neighborhoods are selected, configured and sized so that the volume data set can be analyzed with non-overlapping subdivision of the voxel data.

Other embodiments are directed to systems for generating DVR medical images. The systems include a volume rendering medical image processor system configured to generate data for a diagnostic medical image of a target region of a patient by electronically subdividing a volume rendering data set using local histogram analysis to separate different tissues with overlapping image intensity values.

In some embodiments, the image processor system may be configured to automatically electronically: (a) identify range weight values of different tissue associated with the patient medical volume data set using the local histogram analysis: (b) generate partial range histograms based on the local histogram analysis: and (c) generate adaptive trapezoids using the partial range histograms, to thereby generate the diagnostic medical image.

Still other embodiments are directed to computer program products for providing physician interactive access to patient medical volume data for rendering diagnostic medical images using a computer network. The computer program product includes a computer readable storage medium having computer readable program code embodied in the medium. The computer-readable program code includes computer readable program code configured to generate partial range histograms having associated peak characteristics and intensity values to electronically identify different types of tissue having overlapping image intensity values to thereby provide data used to render a diagnostic medical image of a target region of a patient.

It is noted that any of the features claimed with respect to one type of claim, such as a system, apparatus, or computer program, may be claimed or carried out as any of the other types of claimed operations or features.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 is a block diagram of a rendering system with a DVR image processor system according to embodiments of the present invention.

FIG. 4 is a flow chart of operations that may be used to visualize volume data in diagnostic medical images according to embodiments of the present invention.

FIG. 15A is a medical image rendering of the heart showing the coronary artery using a conventional 1-D TF.

FIG. 15B is a magnified view of the coronary artery shown in FIG. 15A.

FIG. 16A is a medical image rendering of the heart showing the coronary artery using voxel-centric local neighborhoods according to embodiments of the present invention.

FIG. 16B is magnified view of the vessels and spongy bone shown in the image in FIG. 16A.

FIG. 17A is a medical image rendering of the heart showing the coronary artery using double-block local neighborhoods according to embodiments of the present invention.

FIG. 17B is magnified view of the vessels and spongy bone shown in the image in FIG. 17A.

FIGS. 18A-18C are medical image renderings of a liver with a tumor. FIG. 18A was obtained using a conventional 1D TF rendering model.

FIG. 18B is an image that was altered to attempt to highlight the tumor also using a 1D TF. FIG. 18C illustrates the image rendered using a 2-D TF with local neighborhood data according to embodiments of the present invention.

DETAILED DESCRIPTION

Figure 1:
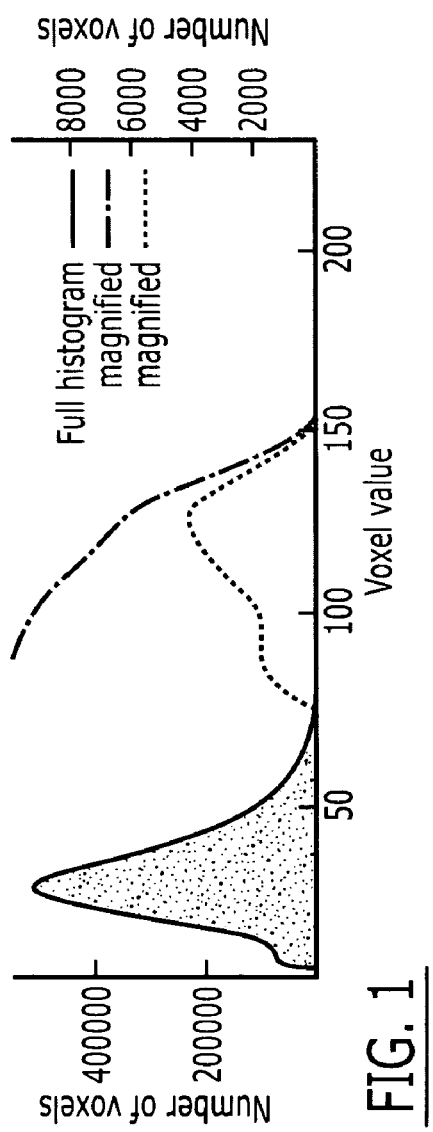
FIG. 1 is a global histogram of number of voxels versus voxel values of a data set of MR renal arteries (full and magnified).

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. In the claims, the claimed methods are not limited to the order of any steps recited unless so stated threat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The term "Direct Volume Rendering" or DVR is well known to those of skill in the art. DVR comprises electronically rendering a medical image directly from volumetric data sets to thereby display color visualizations of internal structures using 3D data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

The term "global histogram" means a main histogram of a volume rendering data set of numbers of voxels versus voxel values that represents a target region of an image, such as of a portion of a patient body, that can be subdivided into local histograms. The term "local histogram" is a histogram for a single local neighborhood. The term "local neighborhood" means a related region of voxel intensity data. The related region of data may be of any desired shape or size and number of voxels. The local neighborhoods may be configured as arbitrary non-overlapping subdivisions of voxel data from the volume rendering data set. The local neighborhoods may have the same shape and same size or different shapes and sizes. The local neighborhoods may be configured as arbitrary non-overlapping subdivisions of voxel data. In some particular embodiments, each local neighborhood may contain at least about 50 voxels. In some examples, the local neighborhood can be cubical blocks that are about at least 8 voxels wide. The term "partial range histograms" means histograms that are populated by one or more (the sum of) selected local histograms in the data set in a partial intensity range that may provide a relatively large foot print in the partial intensity range and may include blocks distributed through a volume (they are not required to have a common locality). A region (such as block) associated a local neighborhood may be selected to belong to a set of partial range histograms if the region has a sufficient number of voxels within a given range weight in a partial range. Although illustrated herein for discussion purposes as graphs when interrogating volume data, the histogram is not required to be generated in a graphic format and can be stored, manipulated or interrogated as a numerical data set.

The term "peak characteristic" describes one or more parameters associated with a peak lineshape (such as, but not limited to, height, width, average width, median location, volume, or other measure) associated with a peak or peaks in a histogram. The term "automatically" means that the operation can be substantially, and typically entirely, carried out without human or manual input, and is typically programmatically directed or carried out. The term "electronically" includes both wireless and wired connections between components. The term "adaptive" means that the shape and size of the geometric perimeter lineshape (typically a trapezoid) is automatically electronically fitted to a histogram based on selected parameters and/or characteristics of the local histogram. The term "tissue" means blood, cells, bone and the like. "Distinct or different tissue" or "distinct or different material" means tissue or material with dissimilar density or other structural or physically characteristic. For example, in medical images, different or distinct tissue or material can refer to tissue having biophysical characteristics different from other (local) tissue. Thus, a blood vessel and spongy bone may have overlapping intensity but are distinct tissue. In another example, a contrast agent can make tissue have a different density or appearance from blood or other tissue. The term "transfer function" means a mathematical conversion of volume data to image data. Visualization means to view in 3-D volume data representing features with different visual characteristics such as with differing opacity, color, texture and the like. The term "similar examination type" refers to corresponding anatomical regions or features in images having diagnostic or clinical interest in different data sets corresponding to different patients (or the same patient at a different time). For example, but not limited to, a coronary artery, organs, such as the liver, heart, kidneys, lungs, brain, and the like.

In the past, DVR has been carried out with the global histogram acting as the guiding tool used to find tissues of interest based on intensity scale. However, the target tissues of interest may be minor features, making their contribution almost, if not entirely, invisible in the global histogram. Generally stated, embodiments of the present invention can employ local histograms that can expose peaks, peak characteristics and/or value ranges that may be obscured or suppressed in the global histogram. The local histograms can be used to express properties in terms of histogram content in local neighborhoods. Embodiments of the present invention can employ data from local histogram analysis for either material (tissue) detection or material (tissue) classification, or both. Thus, the local histogram analysis can be employed for tissue classification without the tissue detection, tissue detection without tissue classification, or tissue detection and tissue classification together.

FIG. 1 is an intensity graph of an MR renal arteries data set showing a global (full) histogram (solid line with stippled fill), a magnified scale of the global histogram (dashed line with long segments separated by shorter segments), and arteries magnified (evenly broken line). The arteries are significantly, if not totally, obscured in the full histogram. As shown, in the global histogram, a single main peak that is associated with tissue/structure of lesser interest, dominates the minor peak of the arteries, the latter of which is the tissue of primary interest for certain evaluations.

Some embodiments of the present invention employ data derived from the local histograms (such as neighborhood characteristic data) to classify the voxels in an overlapping intensity range. The classification value can be used as a second attribute value for the voxels, which in connection with a multi-dimensional or multi-attribute (such as 2D) TF, can provide enhanced rendering. The second attribute or dimension may be constructed as a linear interpolation of tissue-specific trapezoids or other defined lineshape used to define one or more visual characteristics of the tissue (such as color-opacity), decreasing the complexity for a user. The TF's provided by embodiments of the present invention may be used to identify in vivo materials in an intensity scale, then apply a visual characteristic(s) of feature(s) to them (different color, opacity, density, etc . . . ). Embodiments of the invention in the specification will be discussed with respect to provide diagnostic medical images, but may be used in other non-medical DVR applications as well.

Some embodiments of the invention may be particularly suitable for processing MRI data (which may not have a calibrated intensity scale) wherein volume rendering may otherwise be difficult, particularly where there are different features of interest and/or different in vivo materials or tissues having overlapping intensity values.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic or other electronic storage devices. The computer program product can be transmitted over a transmission media such as those supporting the Internet or an intranet.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In some embodiments, some program code may execute on local computers and some program code may execute on one or more local and/or remote server. The communication can be done in real time or near real time or off-line using a volume data set provided from the imaging modality.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
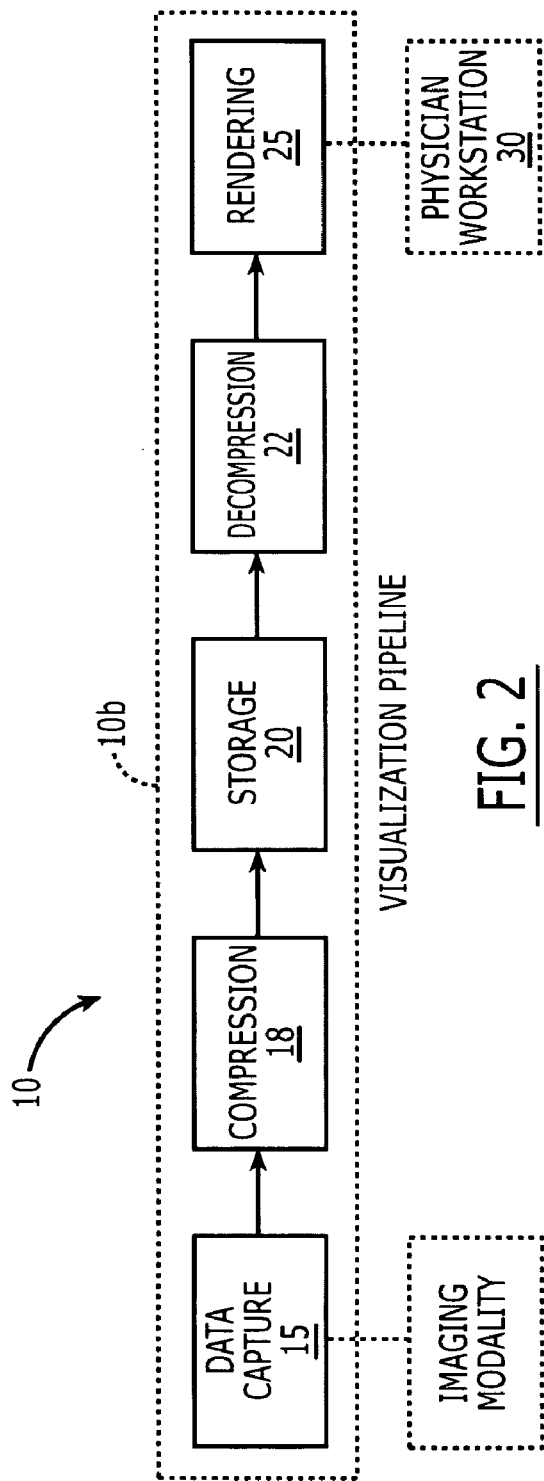
FIG. 2 is a block diagram of an electronic visualization pipeline according to embodiments of the present invention.

Turning now to FIG. 2, a visualization pipeline 10 is illustrated. As known to those of skill in the art and as shown by the broken line box 10b, the pipeline 10 can include a data capture circuit 15, a compression circuit 18, a storage circuit 20, a decompression circuit 22 and a rendering system 25. The visualization pipeline 10 can be in communication with an imaging modality 50 that electronically obtains respective volume data sets of patients and can electronically transfer the data sets to the data capture circuit 15. The imaging modality 50 can be any desirable modality such as, but not limited to, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both CT and MRI volume image data). In some embodiments, the system 10 may optionally combine image data sets generated from different imaging modalities 50 to generate a combination image for a patient.

As shown, the rendering system 22 may be in communication with a physician workstation 30 to allow user input and interactive collaboration of image rendering to give the physician the image views of the desired features in generally real time. The rendering system 25 can be configured to zoom, rotate, and otherwise translate to give the physician visualization of the patient data in numerous views, such as section, front, back, top, bottom, and perspective views. The rendering system 22 may be wholly or partially incorporated into the physician workstation 30, but is typically a remote or local module, component or circuit that can communicate with a plurality of physician workstations (not shown). The visualization system can employ a computer network and may be particularly suitable for clinical data exchange/transmission over an intranet.

FIG. 3 illustrates that the rendering system 25 can include a DVR image processor system 29. The image processor system 29 can include a digital signal processor and other circuit components that allow for collaborative user input 30i as discussed above. Thus, in operation, the image processor system 29 renders the visualization of the medical image using the medical image volume data, typically on a display at the physician workstation 30.

FIG. 4 illustrates exemplary operations that can be carried out to render images according to embodiments of the present invention. A plurality of local histograms derived from volume rendering data set can be automatically electronically analyzed (block 100). Data used for one or more of material classification or material detection, of materials in the data set including materials of similar intensity, can be programmatically generated (block 110).

A direct volume rendering diagnostic medical image can be programmatically generated based on the interrogating step (block 106). As shown, the (medical) volume data set can optionally comprise MRI data (block 105) or CT X-ray data (block 107).

In some embodiments, the analyzing local histograms can include automatically electronically detecting peak characteristics and/or range weight values of voxels associated with different materials in the local histograms. Each local histogram may be generated to have peak characteristics and an associated intensity value range associated therewith. The volume data set can be automatically electronically interrogated (analyzed) using iterative subdivision of the data set using local histograms to detect substantially all voxels with similar intensity and/or peaks and/or peak characteristics of distinct materials.

In some embodiments, user input can be obtained to define a priori domain data regarding at least one feature and/or material of interest in the image (block 108). In some embodiments, a statistical model of classification probability can be electronically employed to classify as to which feature or material type a voxel in the medical data set belongs, where there are overlapping intensity values (block 109).

Figure 5A:
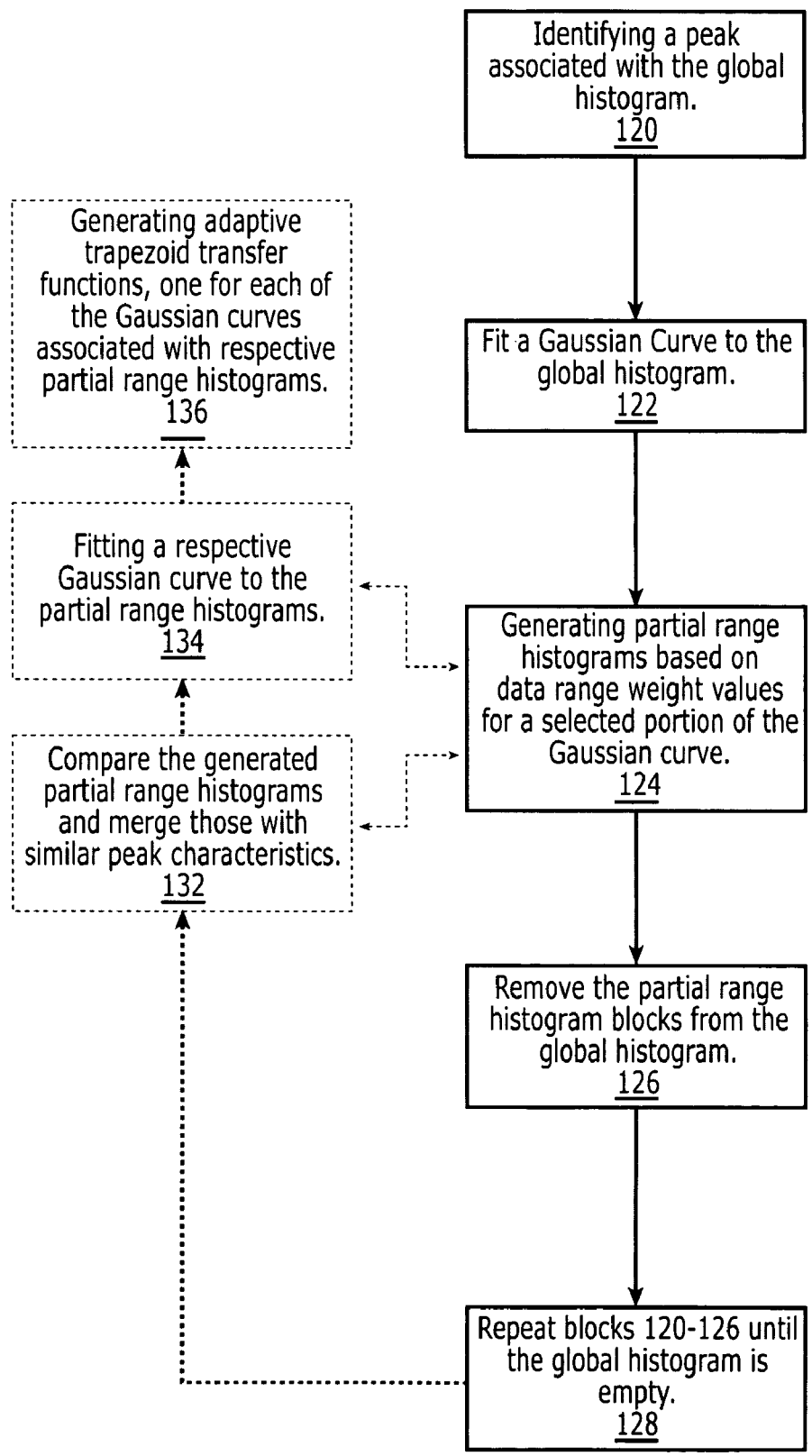
FIG. 5A is a flow chart of operations that may be used to visualize volume data in diagnostic medical images according to embodiments of the present invention.

FIG. 5A is a flow chart of operations that can be used for automatic or semi-automatic tissue-specific detection to obtain visualization of volumetric data (render images) according to embodiments of the present invention. Peak characteristics associated with a peak (typically the highest peak) of interest in the primary or global histogram is identified (block 120). A Gaussian curve can be fit to the shape of the histogram lineshape (block 122). The curve may be fit using a midpoint, height, and deviation value of the histogram. Local partial range histograms can be created based on data range weight values for a selected portion of the Gaussian curve (block 124) thereby revealing, detecting and/or generating a plurality of more narrow peaks associated with tissues in this portion of the data. The selected portion of the global histogram that is used to focus the local histogram analysis can be a medial portion. The partial range histogram blocks can be removed from the global histogram (block 126). That is, in some embodiments, as each local histogram is analyzed, the blocks associated with the respective local histogram can be electronically removed from the main histogram and a new peak for the adjusted main histogram can be generated. Operations describe in blocks 120, 122, 124 and 126 can be repeated until the global or main histogram is substantially, if not entirely, empty (block 128).

The term "Partial Range Histogram" ("PRH") refers to a composite set of histograms for a set of neighborhoods that are typical for a given intensity range as discussed above. The neighborhoods can have an arbitrary shape, but typically fill the volume and are non-overlapping. The partial range histogram can be created in two ways, either through automated tissue detection (see, e.g., block 170 of FIG. 5B) or by allowing an operator or physician to manually define a partial range.

In some embodiments, PRHs can be based on cubic block neighborhoods. In this example, to select the blocks to be part of a PRH, a mathematical equation for a range weight $w_r$ can be used to measure the size of the neighborhood footprint in the partial range as expressed in Equation (1).

$$w_r(\Phi, N) = \frac{|N \cap V_\Phi|}{|N|} \quad (1)$$

N is an arbitrary voxel neighborhood, $V_\Phi$ is the set of voxels within a range $\Phi$. $|V|$ denotes the number of voxels in a set V. A block is added to the PRH if the range weight is sufficiently high, typically defined as where: $w_r \geq \epsilon$. The data set characteristics determine the threshold. In some embodiments, one can use $\epsilon=0.95$ to capture narrow features and $\epsilon=0.5$ to pick up inhomogeneous regions. In particular embodiments, a block size of $8^3$ can be used. The block size choice is a trade-off between the simplicity of larger blocks and the sensitivity for narrow features associated with smaller blocks. Note that a PRH does not need to find all blocks containing a material, since the position of the PRH is the primary input to TF construction (not the height).

Referring again to FIG. 5A, the partial range histograms can be compared and if peak characteristics of the partial range histograms (typically using Gaussian curves) are determined to be similar, such as the shapes have similar deviation and their means are relatively similar, the similar partial range histograms can be merged (block 132). A new Gaussian curve can be generated for merged curves to allow for multiple merges. In some embodiments, Gaussian curves can be generated for each PRH (whether merged or unmerged) (block 134). As such, a partial range histogram and associated Gaussian curve can be generated for each peak and/or peak characteristic that corresponds to different/distinct tissue material and/or feature. A transfer function can be generated using an adaptive selected lineshape associated with at least one visual characteristic can be generated for each partial range histogram using the respective Gaussian curve (block 136). The adaptive selected lineshape may be a color-opacity trapezoid.

In some particular embodiments, a fully automatic analysis of the global histogram using iterative subdivision of the histogram data (e.g., the volume data set) to detect all peaks corresponding to different materials using partial range histograms. The automated analysis steps may include:

1. Find the highest peak of the main histogram.
2. Fit a Gaussian to the main histogram using data associated with the peak.
3. Create a PRH for a mid-portion of the Gaussian.
4. Remove the PRH blocks from the main histogram.
5. Run steps 1-4 until the main histogram is empty.
6. Merge PRH's with peak characteristics (or peaks) that are similar.

Thus, in some embodiments, the analysis can start with volume data associated with the global or main histogram range. The highest peak is identified and a Gaussian curve is fitted to its shape. The Gaussian may be described by the midpoint $\mu$, height $\hbar$, and deviation $\sigma$. The fitting process reduces the accumulated height difference between the histogram and the medial portion of the Gaussian. The error summation range is $\mu \pm \alpha \sigma$. In some embodiments, $\alpha=1$. This small range may be selected because typically only the tip of the histogram peak is visible.

The next step is to create a PRH for a desired range. For example, the range can be selected as: $\mu \pm \sigma$. This range choice yields many narrow, accurate peaks. Since the merging step follows, an abundance of peaks is not a problem. The blocks of the first PRH can be stored and/or removed from the main histogram. This exposes a new peak in the "main" histogram and the analysis algorithm repeats. If a PRH is empty, the $\epsilon$ value can be lowered and step 3 can be performed again. In this structured manner, all blocks can become part of a PRH. Then, PRH's having similar peak characteristics (e.g., similar peaks) can be merged.

To describe the PRH peak characteristics, a Gaussian can be fit to each PRH with the same method as described above. For the PRH Gaussian, the error summation may be adjusted. For example, $\alpha=2$ may be employed because the entire peak is typically exposed. PRH's can be merged or joined if they have similar peak characteristic or peak deviation. In some embodiments, "similar deviation" can be defined as when $\sigma_{max}/\sigma_{min} \leq 4$, while their means are close. Their means may be considered close when, $\mu_{max}-\mu_{min} \leq \sigma_{min} \cdot \max(1.0, 2.0-\sigma_{min}/40.0)$. By defining the similar deviation in this manner, the second criterion is less strict for narrow peaks. For merged PRH's, a new Gaussian can be fitted to allow for multiple mergers. As used herein, the term PRH also refers to the merged PRHs.

It is noted that there are many suitable ways to construct a transfer function as known to those of skill in the art. In some examples herein, trapezoids are used to generate the transfer function that provides a graduated image intensity scale. The trapezoidal transfer functions may be particularly suitable for embodiments generating interactive tissue exploration tools for a physician as will be discussed further below. However, in some embodiments, particularly with respect to tissue detection, local histogram analysis can be used to generate (or adapt, see below) transfer functions of other types.

Figure 19:
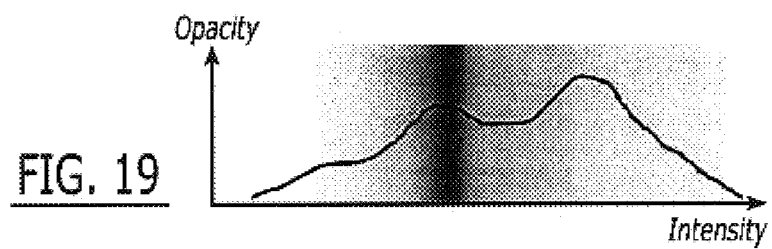
FIG. 19 is a graph of opacity versus intensity overlaying a color gradation map illustrating an example of a transfer function where color and opacity mapping for an intensity value are decoupled, continuous functions.

In some embodiments, the tissue detection can be seen as a calibration tool, independent of a transfer function concept, and can be compared to other calibration/standardization efforts. See e.g., *On standardizing the MR Image Intensity Scale*, Nyul & Udupa, Magnetic Resonance in Medicine, 1999 (which proposes a method based on global histogram comparisons). An example of another type of transfer function is when the color and opacity mapping for an intensity value are decoupled and generate continuous functions as shown graphically in FIG. 19. FIG. 19 illustrates opacity versus intensity, with colors varying in a general continuum from left to right across the graph (white, yellow, dark yellow, orange, red, pink, purple, blue, etc. with the colors intensifying from right to left within color segments).

In particular embodiments, the tissue detection methods of the present invention can be used to adapt, improve, calibrate, evaluate and/or extend existing manual transfer functions, rather than creating new ones "from scratch" as described in more detail herein under Example 3 for an MR angiography embodiment. In operation, manual or a priori transfer functions can be created or established with a minor training set (such as about three-ten cases of exemplary volume rendering data sets of a target region with similar materials and configurations of features, such as images of the same target region of a body). The automated tissue detection described herein can be applied on the training sets, and a relation between the detected tissues using the automated tissue detection methods and the manual and/or a priori transfer function can be derived. Then, the tissue detection can be applied to other, unknown, data sets of the same type. Knowing the relation, an appropriate transfer function (one with increased reliability) can be established for each individual anatomical feature or material of interest in an image.

In some embodiments, an adaptive trapezoid can be used to create a transfer function from a partial range histogram. This can be achieved via the fitting of a Gaussian to the partial range histogram as described above. However, as noted above, in other embodiments, other types of transfer functions can be employed.

Figure 5B:
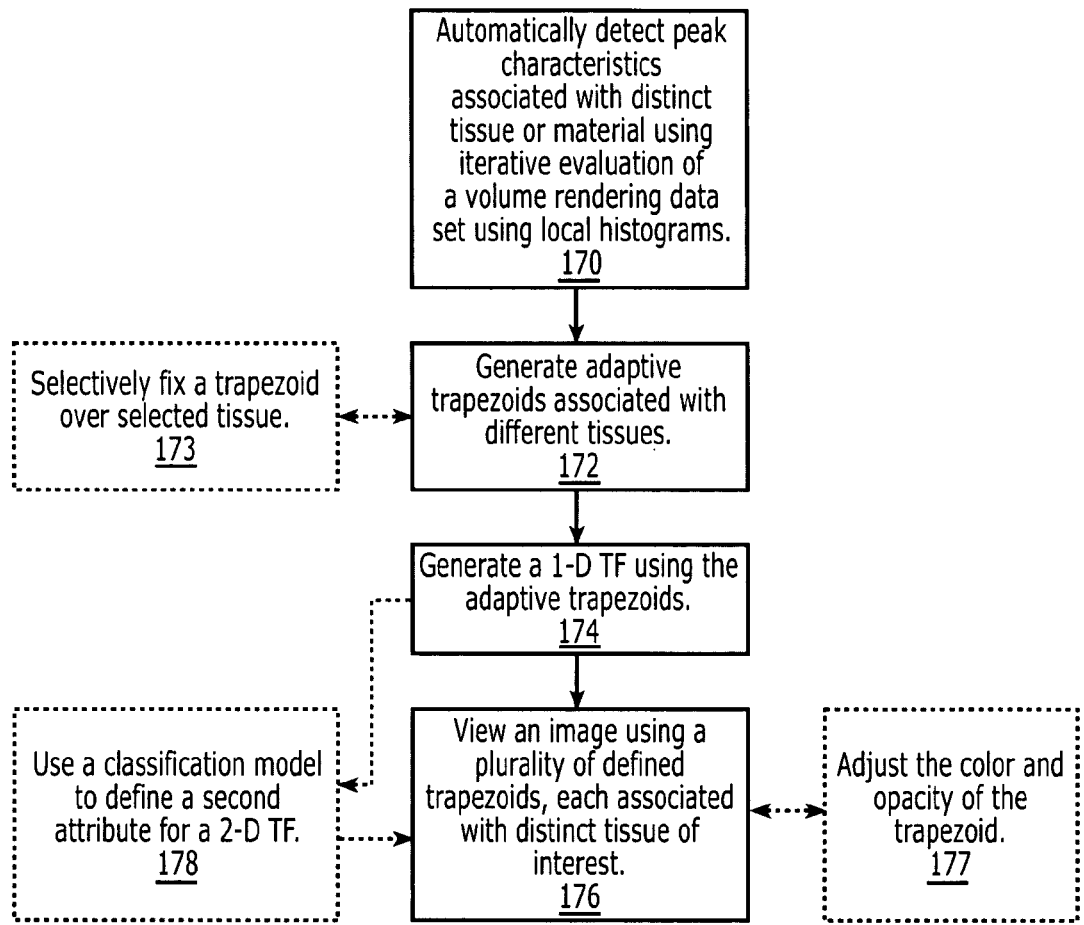
FIG. 5B is a flow chart of operations that may be used to visualize volume data in diagnostic medical images according to embodiments of the present invention.

FIG. 5B is a flow chart of operations that may be carried out to semi-automatically (with manual input) or automatically generate transfer functions to visualize the image volume data. Peak characteristics associated with material and/or features in the volume data set can be automatically detected using the iterative evaluation of the volume rendering data set using local histograms (block 170). Alternatively, or additionally, a partial range histogram can be created by manually defining a partial range of interest, along with or instead of automatically generating partial range histograms.

Figure 7A:
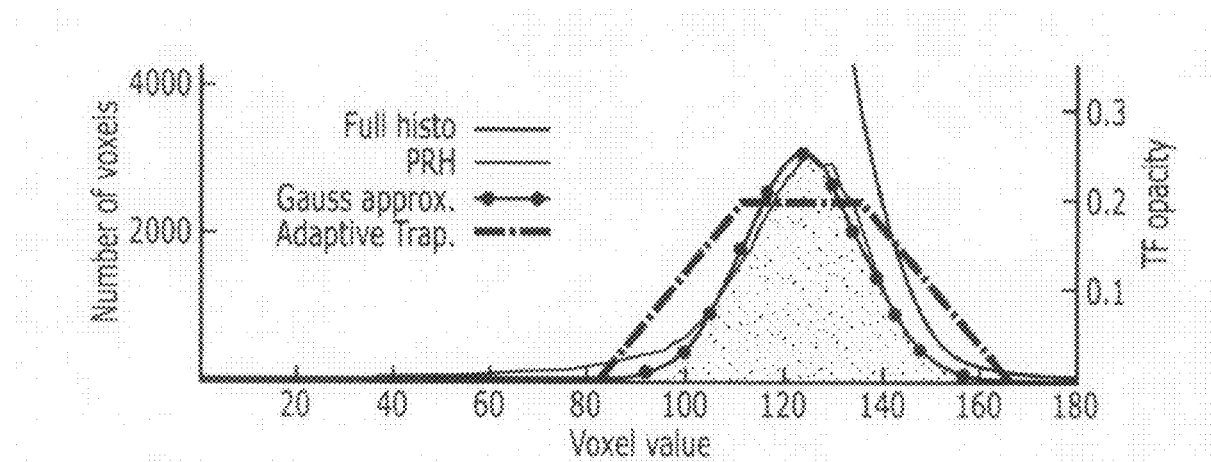
FIG. 7A is a full histogram and a partial range histogram of number of voxels versus voxel values with a Gaussian curve and an adaptive trapezoid having a transfer function with an opacity scale according to embodiments of the present invention.

In some embodiments, the automated or manually assisted tissue detection (which may include peak characteristic detection) can employ one or more of those operations described in FIG. 5A. An adaptive trapezoid (or other selected transfer function shape) can be generated as a component that adapts its center, width and shape to the Gaussian approximation of a PRH as shown for example in FIG. 7A. FIG. 7A illustrates a PRH which is a portion of the global histogram data with a Gaussian curve fit over the PRH. A trapezoid can be fit over the Gaussian (defined by parameters of the Gaussian).

Figure 7B:
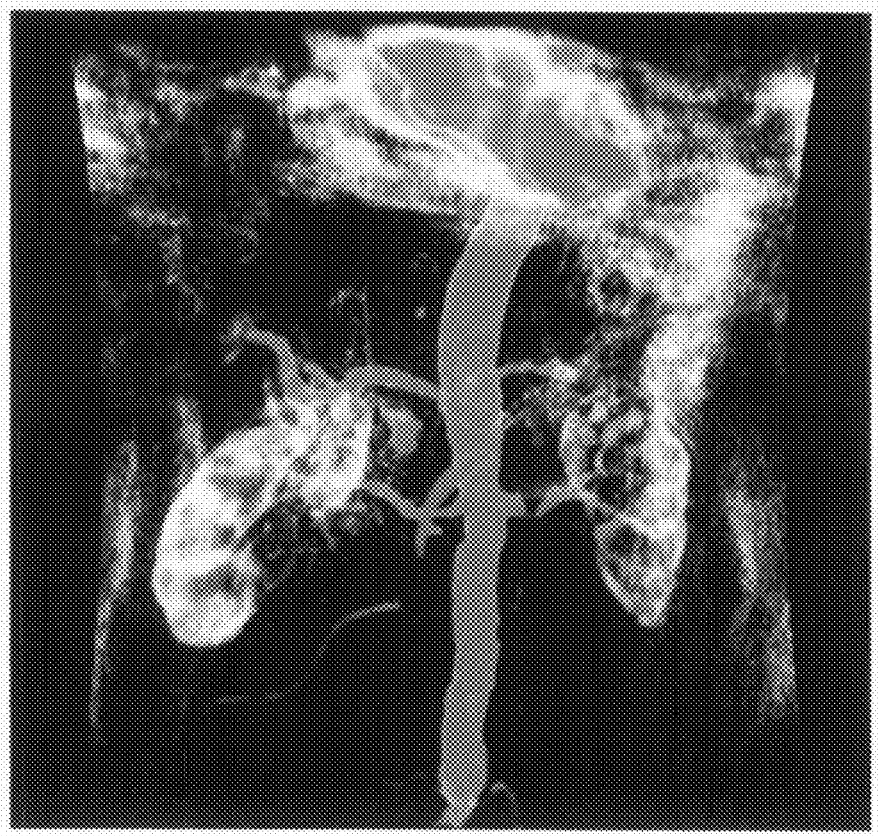
FIG. 7B is a color rendering generated using the local histogram data shown in FIG. 7A.

Referring again to FIG. 5B, the adaptive trapezoid can optionally be selectively passed over viewing areas of an image and then locked or affixed to engage selected tissue (block 173). A 1-D TF can be generated using the adaptive trapezoids (block 174). An image using a plurality of the generated trapezoids, each associated with distinct tissue of interest can be generated (block 176). The color and opacity of one or more trapezoids can be adjusted (block 177). The adjustment can be automatic or manual based on input from the physician. FIG. 7B is a rendering resulting from the local histogram data shown in FIG. 7A. A low opacity gray ramp was added to the TF for clarity.

In some cases, the neighborhood histogram data can be sufficient to generate the rendered image in that different surroundings of equal-intensity voxels can provide diversifying information. That is, local histogram analysis can be used to classify voxels in a type of morphological filtering and/or fuzzy classification. In some embodiments, a classification model can be used to define a second attribute for a 2-D TF (block 178) as will be discussed further below.

In some embodiments, adaptive trapezoids can allow an efficient workflow when manually defining or modifying a TF "on the fly" using the following operations, which allow for some physician input:
1. Apply automatic tissue detection.
2. Activate an adaptive trapezoid, during an initial stage of the analysis, the TF can consist of this single trapezoid.
3. Browse the detected PRHs until the adapted trapezoid highlights a tissue or feature of interest.
4. Fixate the trapezoid at this position, making it static and temporarily disconnected from the TF.

5. Perform steps 2-4 until all tissues of interest are found.
6. View the full TF, i.e. activate all defined trapezoids. Adjust the color and opacity for each trapezoid as desired.

Figure 5C:
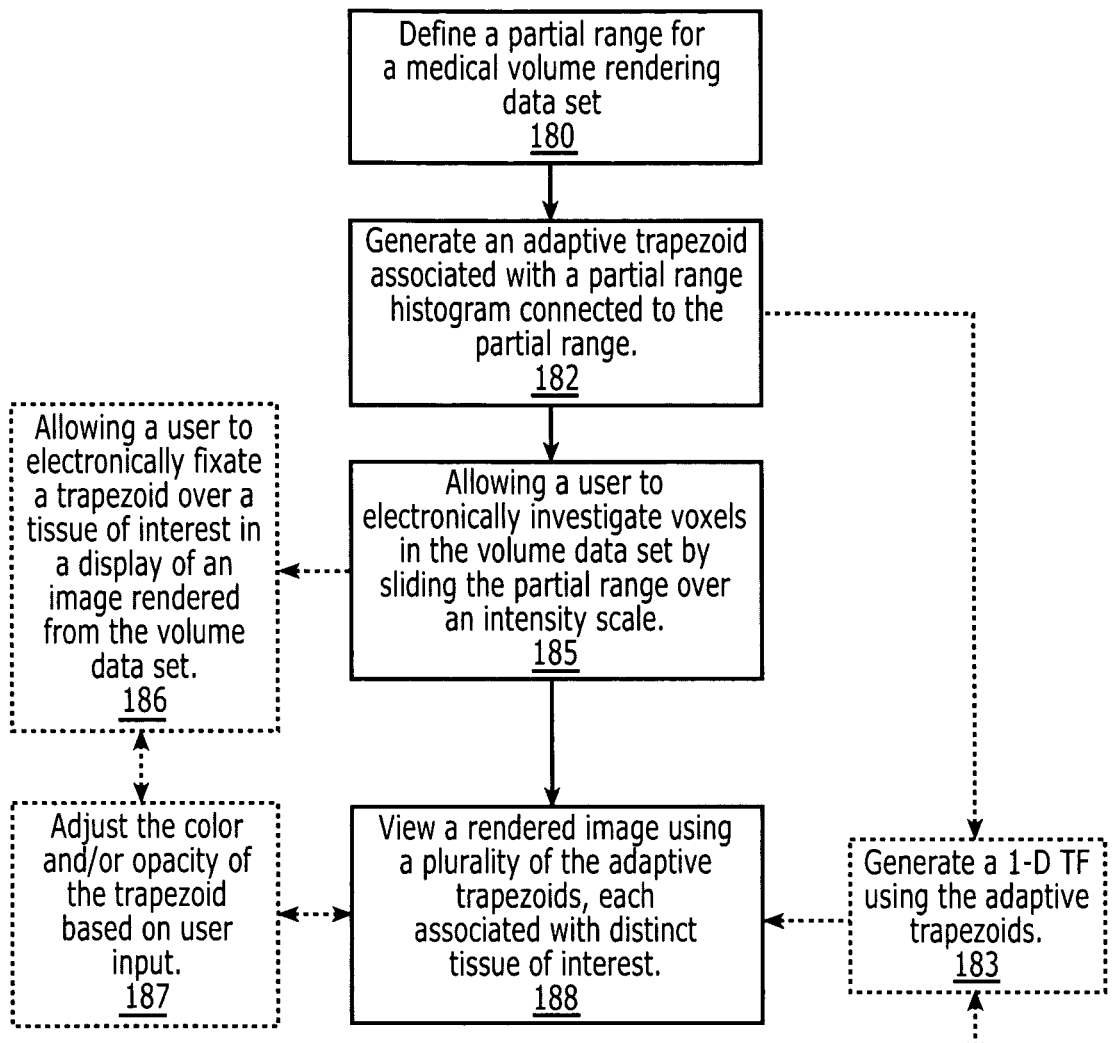
FIG. 5C is a flow chart of operations that may be used to provide an interactive electronic tissue evaluation tool according to embodiments of the present invention.

In addition, adaptive trapezoids can be used as a semi-automatic or manual electronic tissue exploration tool for the user. In so doing, step 1 above can be omitted and step 3 can be replaced by manually sliding the center of a partial range across the intensity scale. For an example of operations that may be used for the physician interactive tool, see FIG. 5C and operations 180-188. For example, a partial range histogram can be defined (block 180), and an adaptive trapezoid associated with or connected to a partial range of interest can be generated (block 182). The display can be configured to allow a user to electronically investigate voxels of interest in the volume data set by sliding the partial range over an intensity scale (block 185). A rendered image can be viewed using a plurality of the adaptive trapezoids (which are active transfer functions), each typically associated with a distinct tissue and/or feature of interest (block 188).

In some embodiments, a user can electronically fixate or overlay a trapezoid over a tissue of interest in the display (block 186). In addition, the color and/or opacity of the trapezoid (the partial range histogram voxels) can be adjusted based on user input (block 187). In addition, as discussed above for operations shown in FIG. 5B, a 1-D transfer function can be generated using the adaptive trapezoids (block 183) and a classification model may be used to define a second attribute for a 2-D transfer function (block 184).

Figure 5D:
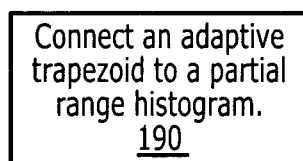
FIG. 5D is a flow chart of operations that may be used to selectively visualize a feature in an image according to embodiments of the present invention.

In some embodiments, selective application of adaptive trapezoids can be used to selectively view neighborhoods of data having particular interest as shown in FIG. 5D. In operation, an adaptive trapezoid can be connected to a partial range histogram (manually or automatically) (block 190). Typically the trapezoid/transfer function is applied globally to generally the whole volume of the rendered image. However, it is also possible to apply the trapezoid selectively as shown in block 192 to thereby enhance visualization of features of interest. This is because irrelevant blocks can be hidden from view in the rendered image (or visually differentiated or suppressed) even if they have voxel intensity contents in the interesting range.

Figure 20A:
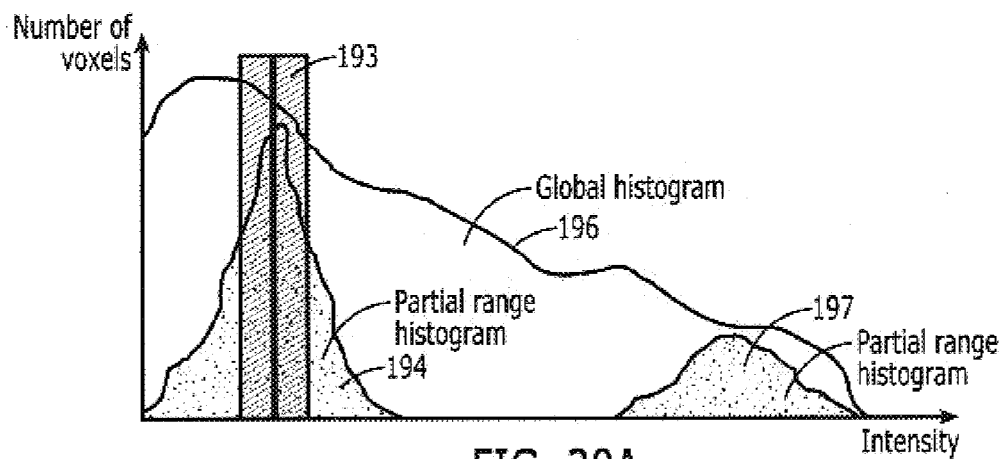
FIG. 20A is a graph of voxels versus intensity of a global histogram with an overlying electronic user-selectable partial range tool according to embodiments of the present invention.
Figure 20B:
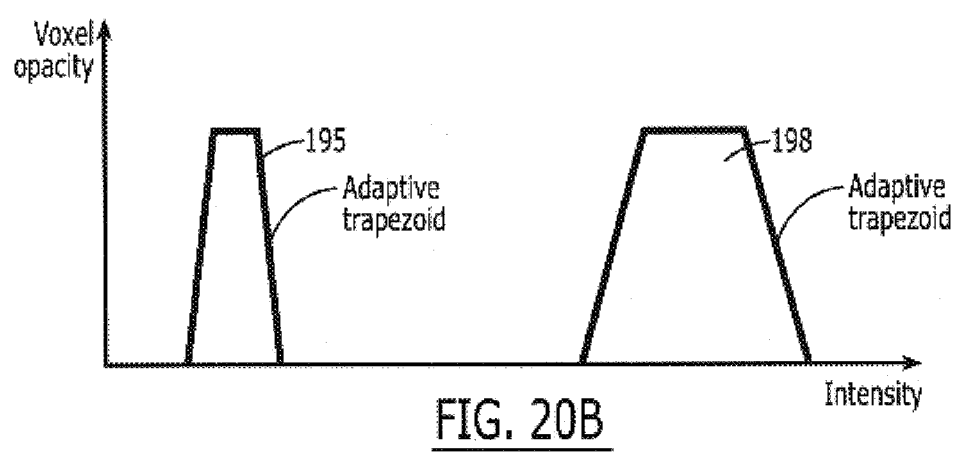
FIG. 20B is a graph of voxel opacity versus intensity of adaptive trapezoid transfer functions created based on the user selectable partial range tool shown in FIG. 20A according to embodiments of the present invention.

FIGS. 20A and 20B illustrate graphically how a user can define a partial range of interest 193 from data associated with the voxel volume rendering data set (shown as the global histogram) 196. In this example, the user-defined range 193 is represented by the tall thin box with the medial vertical line overlying the global histogram 196. A partial range histogram 194 is electronically calculated for the user defined partial range 193 and an adaptive trapezoid 195 (FIG. 20B) corresponding to the partial range histogram 194 can be generated. The corresponding material, tissue or feature can be electronically automatically highlighted, visually enhanced otherwise visually distinguished in the rendering. The process can be repeated, i.e., the user can slide the partial range 193 to a different partial range of interest. A second partial range histogram can be calculated 197 (FIG. 20A). A second adaptive trapezoid 198 (FIG. 20B) associated with the second partial range histogram 197 can be generated. Again, the corresponding material, tissue and/or feature can be highlighted or otherwise visually enhanced or distinguished in the rendering.

Figure 12A:
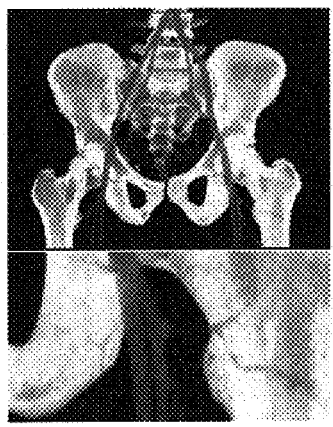
FIG. 12A is a medical image rendering illustrating spongy bone and vessels using a conventional 1-D TF.
Figure 12B:
FIG. 12B is magnified view of the vessels and spongy bone shown in the image in FIG. 12A.

Some embodiments of the present invention are configured to separate overlapping tissue ranges and provide for a truer visualization in the rendered image. That is, in the past, a common problem in medical DVR is in rendering tissues with overlapping intensity ranges. A typical example is CT angiographies, where vessels having a contrast agent have the same intensity as spongy bone. A conventional TF based only on intensity has difficulty in generating a rendering that separates the two tissues as shown in FIGS. 12A and 12B. In contrast, using the local histogram analysis can extend the DVR capabilities in this respect. Such an application of neighborhood operators to classify voxels can be considered to be a type of morphological filtering. See generally Maragos et al., *Morphological systems for multi-dimensional signal processing*, Proceedings of the IEEE 78, 4 (1990), 690-710.

In some embodiments, when the intensity data alone does not sufficiently separate materials, neighborhood histogram analysis data can be used to do so. This is because different surroundings of equal-intensity voxels can provide diversifying (classifying) information. One analysis type that can be used to classify the distinct tissue can be based on range weights as described above with respect to PRH.

In other embodiments, a classification probability model can be used with the local histogram analysis data to separate distinct tissue having substantially similar intensity voxels. This embodiment can be described referring to the example of a heart data set shown in FIGS. 15A, 15B, 16A, 16B and 17A, 17B. The classification model goal is to separate the coronary artery from the large vessels. The images shown in FIGS. 15A and 15B were obtained using a 1D TF. The brightness of the large vessels can impede the visualization of the coronary artery. The image shown in FIGS. 16A and 16B were obtained with a classifying 2D TF with a voxel-centric neighborhood. Additional discussion of exemplary "neighborhood" types is provided later in the application. FIG. 16B is a magnified version of FIG. 16A (the image shown was obtained using $w_{A1}=0.3$, $w_{B1}=0.1$, $w_{A2}=0.2$, $w_{B2}=0.4$). In this image, the coronary artery is more prominent. FIGS. 17A and 17B illustrate images rendered using a classifying 2D TF for a double block neighborhood (the image shown was obtained using $w_{A1}=0.5$, $w_{B1}=0.2$, $w_{A2}=0.2$, $w_{B2}=0.4$ with ranges: $\Phi_1=[1300,1500]$, $\Phi_2=[900,1150]$). FIGS. 17A and 17B also highlight the coronary artery (but, as shown, introduce speckle artifacts at the large vessel boundaries).

The classification model can be configured to use domain knowledge of a physician to define feature or tissue specific criteria. This information can be defined at an OEM facility or at a use facility, then used for future analysis of similar regions of interest across different patients or within the same patient over time.

The classification model can accept input to establish one or more parameters that can specify a characteristic about the feature or tissue of interest. With respect to the coronary artery, a first criterion can be established as: "The coronary artery is more narrow than other vessels". As such, one can define $\Phi_1$ as the mutual range of all vessels. The narrowness can then be described as the range weight $w_r(\Phi_1)$. The system can be configured to allow a physician to define the range weights where the classification is confident. For instance, for a range weight of 0.3, a voxel can confidently be assumed to be a part of a large vessel, whereas a weight of 0.1 confidently implies a coronary artery voxel. These confidence levels can be denoted $w_{A1}$ and $w_{B1}$, respectively.

Figure 8:
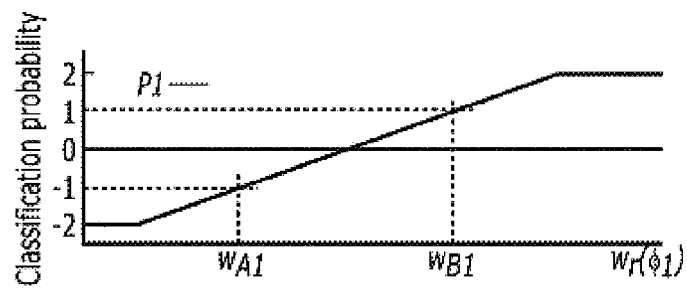
FIG. 8 is a graph of classification probability shown as a function of range weight according to embodiments of the present invention.

A measure $p_1$, defined as the classification certainty from the narrowness criterion can be determined. To do so, a signed representation can be employed, where the sign denotes the most likely tissue (in this example: negative for large vessels) and the magnitude is the confidence of the classification. This form can be achieved as described in Equations 2 and 3, where $C_2$ is a function that clamps to the [−2.0,2.0] interval. The resulting function of classification probability $p_1$ is shown in FIG. 8. The probability $p_1$ is a function of the range weight, $w_r(\Phi_1)$. The transformation can be defined by the confidence levels $w_{A1}$ and $w_{B1}$.

$$\mu_1=(w_{A1}+w_{B1})/2, \delta_1=(w_{B1}-w_{A1})/2 \quad (2)$$

$$p_1=C_2((w_r(\Phi_1)-\mu_1)/\delta_1) \quad (3)$$

A second criterion of domain knowledge that may be used for this example can be associated with relative anatomical or spatial information about the feature of interest. For example, "the coronary artery is close to the heart muscle." As such, $\Phi_2$ can be defined as the range of heart muscle tissue. This proximity criterion can then be described as $w_r(\Phi_2)$. As for the narrowness, the physician can define two confidence levels $w_{A2}$ and $w_{B2}$ corresponding to confident classification as either material. The classification certainty $p_2$ is derived in the same way as $p_1$, see Equation 3. The total classification certainty P can be defined as a weighted sum of $p_1$ and $p_2$.

The general definition of P, valid for the separation of any two materials A and B, is given in Equation 4. There are n materials or criterion that can be used for diversifying criteria, defined by ranges $\Phi_1$ through $\Phi_n$. Each $p_i$ can be derived in accordance with Equation 3. It is possible to steer the contribution from each criterion with the weights $\lambda_i$, but equal weighting is used for the examples shown and discussed herein. P is clamped to the [−1.0, 1.0] interval, where the extreme values correspond to more certain classification. Since the $p_i$ components have a wider range, [−2.0, 2.0], increased confidence from one component can dominate an uncertain classification in another.

$$P = C_1\left(\sum_{i=1}^{n}\lambda_i\rho_i\right), \text{ where } \sum_{i=1}^{n}\lambda_i = 1 \quad (4)$$

In summary, the methods can employ an a priori analysis of criterion to establish how neighborhood materials can achieve the wanted separation of A and B. The information for each material is the range $\Phi$ along with the reference levels $w_A$ and $w_B$. Note that $w_A$ and $w_B$ can have "unnatural" values outside [0.0,1.0]. For example, if a range weight≧0.5 confidently implies tissue B, whereas 0.0 corresponds to equal probability of either tissue, then $w_B$=0.5 and $w_A$=−0.5.

Figure 13A:
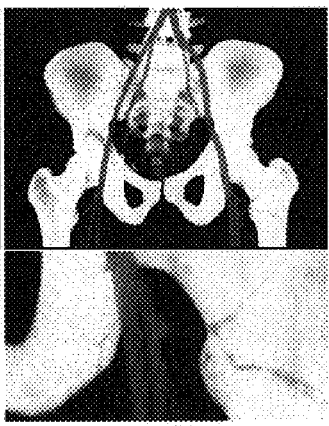
FIG. 13A is a medical image rendering illustrating spongy bone and vessels using voxel-centric local neighborhoods according to embodiments of the present invention.
Figure 14A:
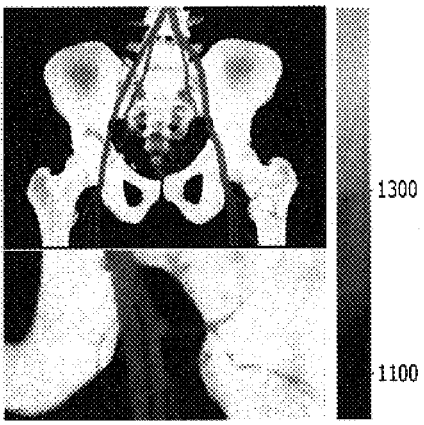
FIG. 14A is a medical image rendering illustrating spongy bone and vessels using double-block local neighborhoods according to embodiments of the present invention.
Figure 13B:
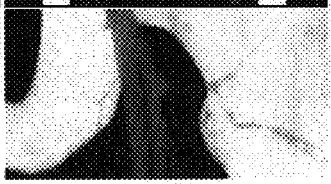
FIG. 13B is magnified view of the vessels and spongy bone shown in the image in FIG. 13A.
Figure 14B:
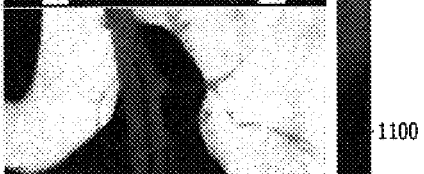
FIG. 14B is magnified view of the vessels and spongy bone shown in the image in FIG. 14A.

For another data set of a different anatomical region, see FIGS. 12-14. FIGS. 12A and 12B were rendered using a 1D TF. In this rendering, spongy bone turns red. FIGS. 13A, 13B and 14A, 14B were obtained using a classifying 2D TF, in each image the vessels stand out more distinctly from the background. FIGS. 13A and 13B were rendered using voxel-centric local neighborhoods ($w_{A1}$=0.0, $w_{B1}$=0.1, $w_{A2}$=0.2, $w_{B2}$=−0.1). FIGS. 14A and 14B were rendered using double-block neighborhoods in which the material separation is achieved with minor artifacts ($w_{A1}$=0.0, $w_{B1}$=0.05, $w_{A2}$=0.2, $w_{B2}$=−0.2: ranges $\Phi_1$=[1300,2000], $\Phi_2$=[900,1150]).

In some embodiments, to separate the tissues in the rendering, the classification probability P from above can be used as a second attribute for each voxel in an overlapping range. This yields a multivariate data set, where the second value can be used to separate the overlapping tissues. In a general case there can be an arbitrary number of tissues, whose ranges may partly overlap. In particular embodiments, it may be assumed that there are no more than two overlapping tissues at any intensity value.

Figure 9:
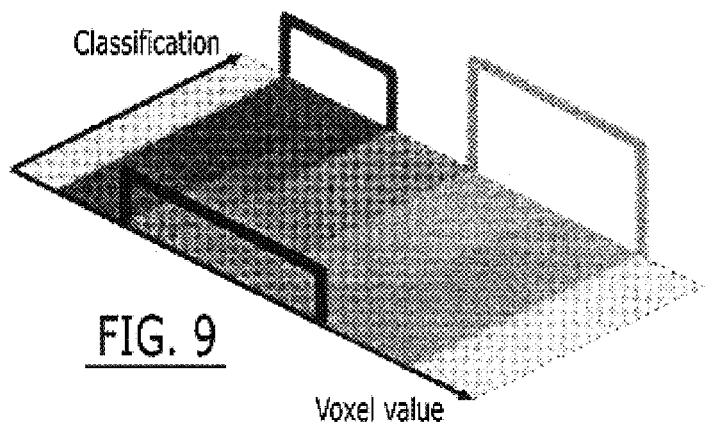
FIG. 9 illustrates a 2-D transfer function (TF), where a conventional 1-D TF is extended with a material classification dimension according to embodiments of the present invention.

To render the multivariate data set, a 2D TF that is defined by tissue-centric trapezoids can be used. A trapezoid can be placed at either extreme of the classification dimension in a way that overlapping trapezoids are always on opposite sides as shown for example in FIG. 9. The second dimension can be filled by linear interpolation of the 1D TFs at the extremes. The interpolation is only necessary for overlapping intensity ranges, for other ranges the 1D trapezoid at one of the extremes can be used. FIG. 9 illustrates that a conventional 1D TF can be extended with a material classification dimension. Trapezoids for overlapping materials can be placed at extreme classification values and the 2D TF can be interpolated between them. The gray scale in FIG. 9 represents two intensity segments where the trapezoids overlap with a smooth transition from blue to red and blue to yellow, respectively. The red segment is marked by the upwardly extending rectangular post on the far left and top part of FIG. 9. The yellow segment is marked by the larger upwardly extending post on the right side of the figure. The blue transition zone is marked by the smaller upwardly extending post on the bottom part of the figure. The 1-D TF is extended with a material classification dimension thereby providing a 2-D TF with classifier attributes.

Advantageously, this approach has a number of desirable features. It is natural for the user to design a TF where one tissue at a time looks good. The adaptive trapezoid workflow is well suited to this task. The automatic interpolation of the second dimension then allows the power of a 2D TF without introducing complexity to the user. Another appealing benefit is that the classification dimension integrates a fuzzy segmentation into the rendering, reducing the impact of misclassification artifacts.

The implementation can be further simplified. In some embodiments, the used data sets have 12-bit precision, leaving 4 bits unused. The value of P, which does not need to be extremely precise, can be entered in these (top) 4 bits.

The local histograms are used to investigate neighborhoods as discussed above. The neighborhoods may be configured in a number of suitable manners as will be understood by those of skill in the art. For brevity of discussion, three different types of voxel surroundings are used in this specification: single block, voxel-centric, and double block neighborhoods. Single block neighborhoods are obtained by a static subdivision of non-overlapping blocks, typically cubes. A voxel-centric neighborhood can be more precise, since the region varies for each position in the volume. For further accuracy, the voxel itself can be defined to not be part of the neighborhood. In the voxel-centric examples of FIGS. 13A, 13B and 16A, 16B, a spherical neighborhood of radius 7 was employed, since this choice has proven to yield reliable statistics for many anatomical features.

Unfortunately, large voxel-centric neighborhoods can require extensive computation. Thus, an alternative complement, a double block neighborhood can be used that yields voxel-specific statistics while being fast to process. Two separate block subdivisions are applied to the volume, where one is shifted half a block size in all dimensions. Thus, each voxel is a member of exactly two blocks. Any neighborhood measure for a voxel is then simply derived as a linear combination of the values calculated for the two blocks it belongs to. The interpolation weights $c_1$ and $c_2$ are determined through two criteria: they are inversely proportional to distance to the center of each block ($d_1$ and $d_2$) and the sum is 1 for each voxel, see Equation 5. The block size of $8^3$ voxels was used for double block neighborhoods in the renderings shown in FIGS. 14A, 14B and 17A, 17B.

$$\begin{cases} c_1 + c_2 = 1 \\ c_1/c_2 = d_2/d_1 \end{cases} \Leftrightarrow \begin{cases} c_1 = d_2/(d_1+d_2) \\ c_2 = d_1/(d_1+d_2) \end{cases} \quad (5)$$

Figure 10:
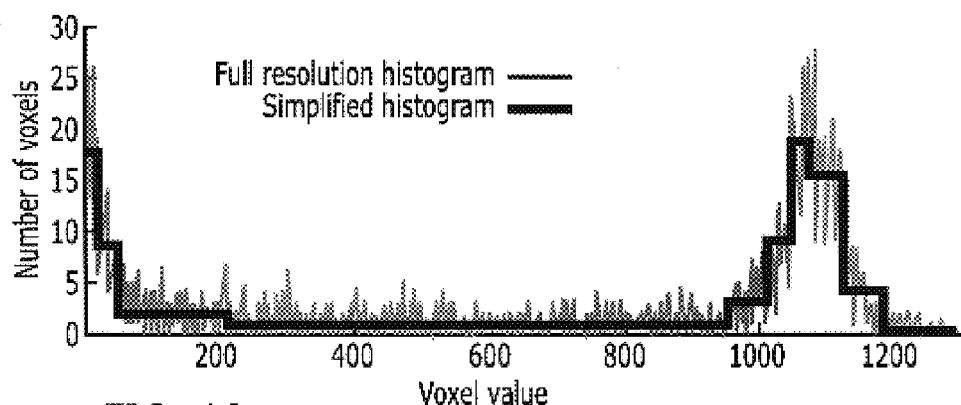
FIG. 10 is a graph of a full resolution histogram and a corresponding simplified histogram of number of voxels versus voxel values according to embodiments of the present invention.

In some embodiments, an additional simplification can be implemented by avoiding the use of fully resolved block histograms. For double block neighborhoods, one can employ the histogram simplification approach described in Ljung et al., *Transfer Function Based Adaptive Decompression for Volume Rendering of Large Medical Data Sets*, Proceedings IEEE Volume Visualization and Graphics Symposium (2004), pp. 25-32. The simplification is based on piecewise constant segments as shown for example in FIG. 10. This method may efficiently preserve the shape of the histogram, especially the peaks and/or peak characteristics. In this reference, the simplification consists of 12 segments with a minimum width of 10.

Figure 6:
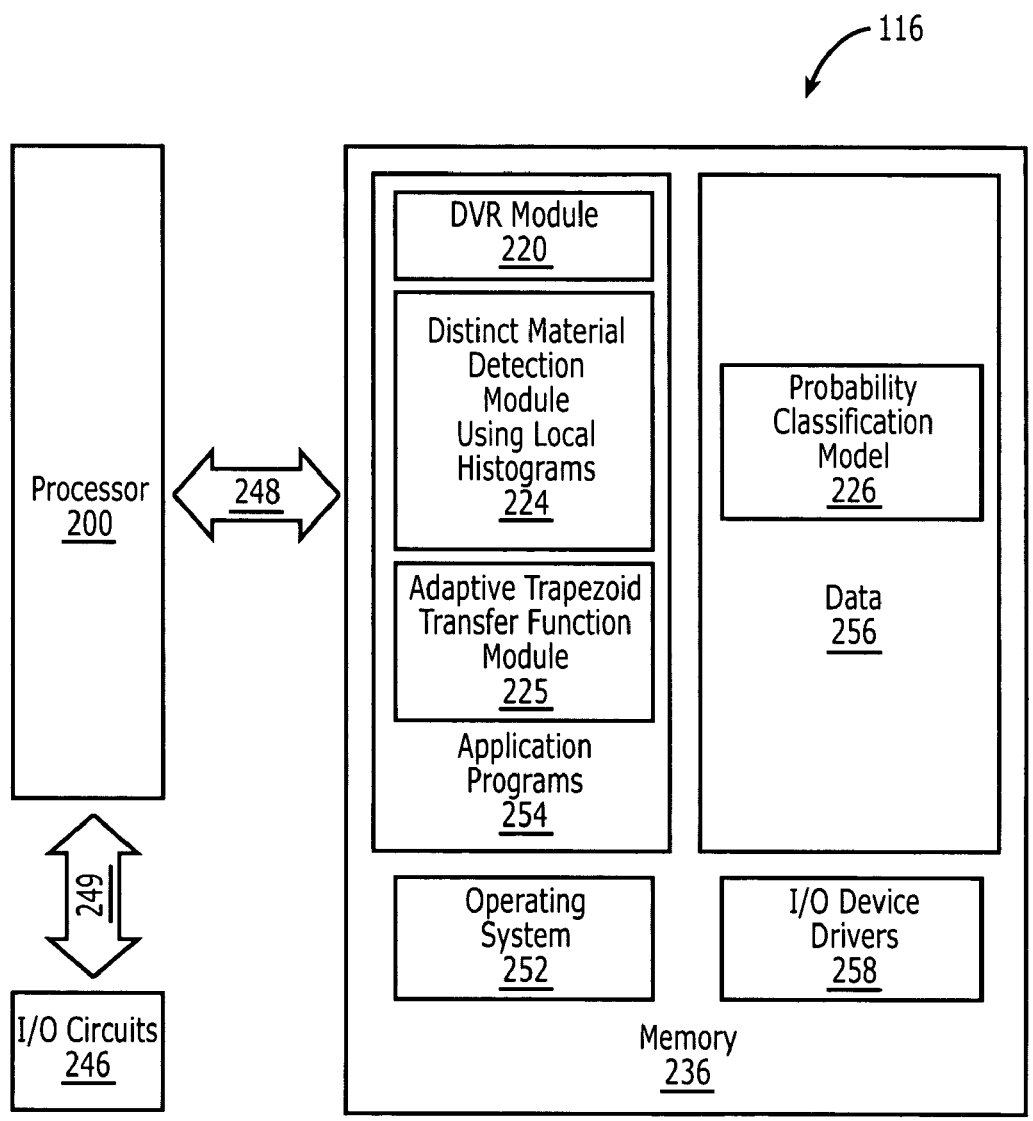
FIG. 6 is a schematic illustration of a data processing system according to embodiments of the present invention.

As illustrated in FIG. 6, embodiments of the invention may be configured as a data processing system, which can be used to carry out or direct operations of the rendering, and can include a processor circuit 200, a memory 236 and input/output circuits 246. The data processing system may be incorporated in, for example, one or more of a personal computer, workstation, server, router or the like. The processor 200 communicates with the memory 236 via an address/data bus 248 and communicates with the input/output circuits 246 via an address/data bus 249. The input/output circuits 246 can be used to transfer information between the memory (memory and/or storage media) 236 and another computer system or a network using, for example, an Internet protocol (IP) connection. These components may be conventional components such as those used in many conventional data processing systems, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk. In some embodiments of the present invention, the memory 236 may be a content addressable memory (CAM).

As further illustrated in FIG. 6, the memory (and/or storage media) 236 may include several categories of software and data used in the data processing system: an operating system 252; application programs 254; input/output device drivers 258; and data 256. As will be appreciated by those of skill in the art, the operating system 252 may be any operating system suitable for use with a data processing system, such as IBM®, OS/2®, AIX®D or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application programs 254 to communicate with devices such as the input/output circuits 246 and certain memory 236 components. The application programs 254 are illustrative of the programs that implement the various features of the circuits and modules according to some embodiments of the present invention. Finally, the data 256 represents the static and dynamic data used by the application programs 254 the operating system 252 the input/output device drivers 258 and other software programs that may reside in the memory 236.

The data 256 may include a probability classification model 226 that provides an attribute for the transfer function module 224. As further illustrated in FIG. 6, according to some embodiments of the present invention application programs 254 include one or more of: a DVR Module 220, a (automatic or semi-automatic) Distinct Material Detection Module Using Local Histograms 224, and may include an Adaptive Trapezoid Transfer Function Module 225. The application programs 220, 224, 225 (and/or Probability Model 226) may be located in a local server (or processor) and/or database or a remote server (or processor) and/or database, or combinations of local and remote databases and/or servers.

While the present invention is illustrated with reference to the application programs 254, 220, 224, 225 in FIG. 6, as will be appreciated by those of skill in the art, other configurations fall within the scope of the present invention. For example, rather than being application programs 254 these circuits and modules may also be incorporated into the operating system 252 or other such logical division of the data processing system. Furthermore, while the application programs 220, 224, 225 are illustrated in a single data processing system, as will be appreciated by those of skill in the art, such functionality may be distributed across one or more data processing systems. Thus, the present invention should not be construed as limited to the configurations illustrated in FIG. 6, but may be provided by other arrangements and/or divisions of functions between data processing systems. For example, although FIG. 6 is illustrated as having various circuits and modules, one or more of these circuits or modules may be combined or separated without departing from the scope of the present invention.

The present invention is explained in greater detail in the following non-limiting Examples.

EXAMPLE 1

Tissue Detection

The automatic tissue detection system as well as the 2D TF classification system has been tested on a number of data sets from actual clinical use at CMIV ("Center for Medical Image Science and Visualization," Linkoping University, Sweden). Results of the automatic tissue detection confirmed that the correct peaks were defined by manual segmentation for each distinct tissue. Some peak detection results are presented in FIGS. 11A and 11B. It is noted that very large and very small peaks were left out of these figures for clarity. The tests resulted in a total number of between about 5-10 peaks for each data set.

Figure 11A:
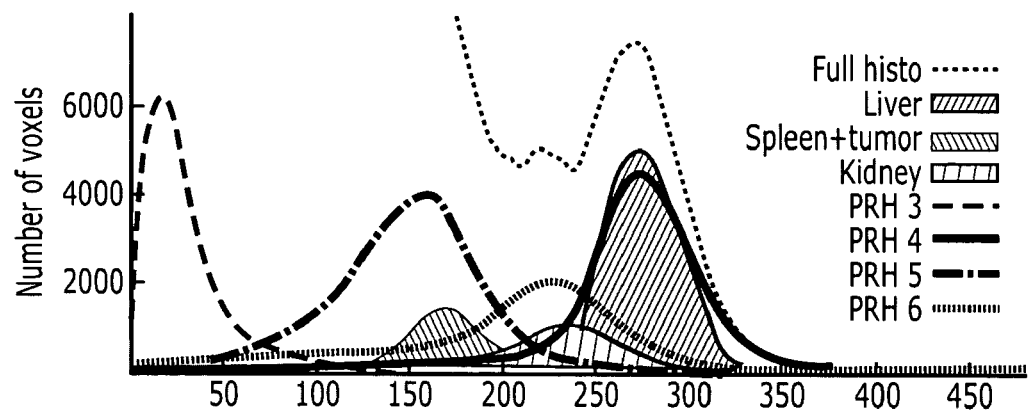
FIG. 11A is a graph of an MRI bilary duct data set with a full histogram, partial range histograms and histograms of certain anatomical features according to embodiments of the present invention.

The first data set evaluation shown in FIG. 11A is an MR examination of the biliary duct, where the automatic peak detection reveals multiple PRHs where the distinct tissues are the liver, kidney, spleen and tumor. The spleen and the tumor are treated as one tissue below, since their histograms fully coincide. A value of $\epsilon=0.5$ was used. The automatic peak detection performs well in finding the position of the tissue peaks. The height estimation varies in accuracy, depending on the extent of other soft tissue in the same intensity range. Deviations in height are a minor concern, since they have little effect on subsequent TF construction. The biliary duct is not found. Its histogram shows diffuse spikes below height 20, hardly characterizable as a peak.

Figure 11B:
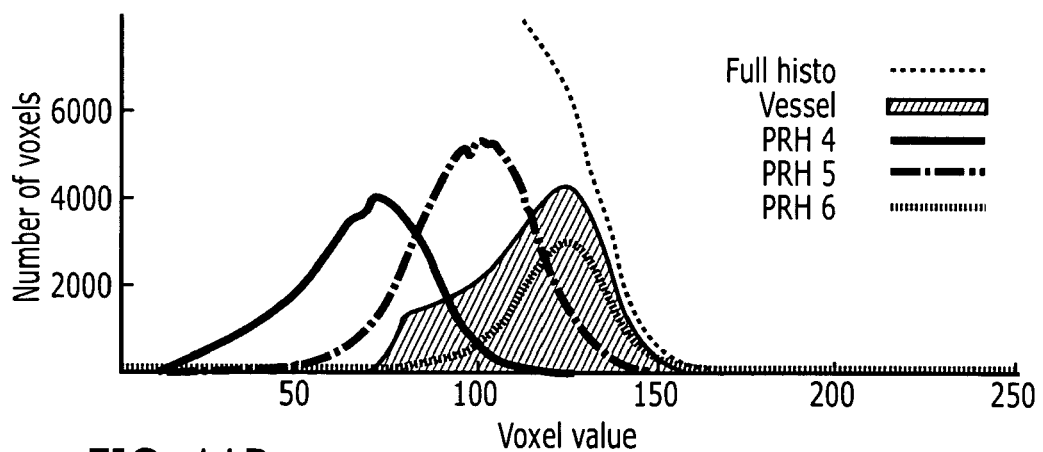
FIG. 11B is a graph of an MRI renal arteries data set with a full histogram, partial range histograms, and a histogram of a vessel of number of voxels versus voxel values according to embodiments of the present invention.

The second data set shown in FIG. 11B is an MR angiography of the renal arteries (see also FIGS. 7A and 7B). The single interesting peak corresponds to the vessels with contrast agent. Despite the extreme difference in height compared to the main peak (4.2 k vs 520 k voxels), the tissue detection scheme accurately locates the vessel peak; the true value being 126, $\mu$ is found at 124. The height is slightly underestimated, since the narrow vessels do not dominate all their neighborhoods. A value of $\epsilon=0.95$ was used. Thus, the detected peak corresponds with the true peak from segmentation.

EXAMPLE 2

Tissue Separation

The 2D TF approach described above has been tested on a CT pelvis angiography data set. The neighborhoods tested are of both voxel-centric spherical and double block type. The parameters of P were derived by manually probing the volume. Vessel voxels were characterized by neighborhoods with much soft tissue and little dense bone. The resulting renderings are shown in FIGS. 13A, 13B and 14A, 14B. The methods very well separate the two issues. The diagnostic value is enhanced since the vessels are not disturbed by red bone in the background. Even the difficult task of preserving thin vessels close to bone is successful. The fuzzy segmentation shows uncertain regions in pink, letting the user make the ultimate classification decision. The spherical neighborhood achieves a smooth classification. The double block approach yields faint speckle artifacts in the bone, but performs well in spite of its simplicity.

The separation can also be applied to identical tissues. An example for a CT angiography of the heart is given in FIGS. 15-17. The 1D TF (FIGS. 15A, 15B) makes all vessels and heart ventricles bright, since they are all filled with contrast agent. However, the primary objective of the examination is to study the coronary arteries. With P as a second attribute, it is possible to highlight only narrow vessels close to muscle tissue. Hence, the visually disturbing large bright regions are removed. A voxel-centric spherical surrounding provides high image quality (FIGS. 16A, 16B). The double block neighborhood (FIGS. 17A, 17B) causes artifacts for large vessel boundaries, being mistaken for narrow vessels, whereas the coronary artery shows few artifacts.

Another example on tissue separation is the MR biliary duct volume of FIG. 1A (see FIGS. 18A-18C). In this example, there is a large liver tumor that is seen as a slightly darker region when rendering the liver only as shown in FIG. 18A. A 1D TF attempting to highlight the tumor is of little help, since it becomes obscured by unimportant tissue as shown in FIG. 18B. When introducing the classification dimension to emphasize homogeneous regions with few low-intensity neighbors, the tumor as well as the spleen (top right) are clearly rendered as shown in FIG. 18C. The image shown in FIG. 18C used a voxel-centric neighborhood configuration ($w_{A1}=0.1$, $w_{B1}=0.6$, $w_{A2}=0.2$, $w_{B2}=0.1$, $\Phi_1=[150,200]$, $\Phi_2=[0,140]$).

As expected, the performance for the large spherical neighborhood is dependent on the number of voxels in the overlapping range. The classification technique may use about 0.02 ms per overlapping voxel, running a 1.8 GHz Intel Pentium M laptop. This amounts to about 32 s for the pelvis angiography data set and about 350 s for the heart. With the double block approach, these times are reduced to about 0.65 s and 1.85 s, respectively, of which about 60% is spent adapting the classification value to the 4-bit format.

EXAMPLE 3

Automatic Parameter Setting for Volume Rendering of MR Angiography

Automatically adjusted parameters for volume rendering (VR) of MR angiography (MRA) data sets were used to analyze contrast-enhanced three-dimensional MRA from 18 patients with abdominal aortic aneurysm (AAA). An automatic algorithm based on partial range histograms was designed to detect the intensity range of the contrast agent in each data set. Three cases were used to derive a relation between the detected range and the optimal VR parameters. The individualized automatic parameters were then applied to each of the remaining 15 patients' data sets. The aortic diameter was measured proximal and distal to the AAA by three independent radiologists. The results were compared to free manual adjustment of VR parameters. Digital subtraction angiography (DSA) was used as the gold standard.

Results of the aorta measurements for VR with the automatic parameters were significantly more precise than with free manual adjustment. The average measurement error decreased from 1.5 mm to 0.7 mm, and the ratio of large errors (>2.5 mm) decreased from 13% to 0%. The interobserver agreement on the measurements was also significantly higher with the automatic parameters. Thus, automatically adjusted parameters for volume rendering of MR angiography data sets have been successfully been generated. Unexpectedly, automatically adjusted parameters were associated with smaller difference to DSA than time-consuming manual adjustment. Altogether, the proposed automatic algorithm makes VR suitable for MRA in clinical practice.

In summary, the use of local histogram analysis can be used to simplify and/or to extend TF design in VR. The simplification achieved by automatic tissue detection and adaptive trapezoids can facilitate a streamlined workflow of medical volume rendering. Preliminary results show that having detected all tissue peaks, it is feasible to automatically adapt TFs between data sets of similar examination types. Peaks that resemble each other, mainly in terms of ħ and σ, can be identified as the same tissue. A TF connected to the tissues can then easily be repositioned.

For the more advanced user, voxel neighborhood properties are shown to extend the TF capabilities. We believe that the framework can be used for many complex rendering tasks.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method of evaluating data associated with direct volume renderings, comprising:

electronically subdividing a volume rendering data set into neighborhoods with local histograms;

automatically electronically analyzing a plurality of the local histograms;

programmatically distinguishing different materials with overlapping intensity values using at least one range weight data value, wherein the at least one range weight data value is derived as the portion of the pixel or voxel intensity values in the local histogram being within a predefined partial range wherein the at least one range weight data value is used to electronically establish whether a sufficient portion of each local histogram is within a defined partial range, and wherein the programmatically distinguishing step uses the at least one range weight data value to determine whether a particular type of material is associated with different neighborhoods having at least some intensity values inside the defined partial range such that the material can be (a) associated with some of the neighborhoods having less than all of the intensity values inside the partial range with a range weight data value below 100% but above a threshold value and (b) not associated with some of the neighborhoods having some of the intensity values inside the partial range with a range weight data value above 0% but below a threshold value;

generating at least one of a visualization attribute or visualization parameters for the pixels or voxels based on the range weight analysis of local neighborhoods used in the programmatically distinguishing step;

rendering an image with the programmatically distinguished different materials using at least one of the generated visualization attribute or the generated visualization parameters; and programmatically generating at least one partial range histogram of data based on the analyzing step to carry out the distinguishing the materials step, wherein the partial range histogram is populated based on the at least one range weight data value and includes local neighborhoods that have a sufficient number of voxels with intensity values within the defined partial range and can include local neighborhoods having one or more voxel intensity values outside the partial range and can exclude local neighborhoods that have voxel intensity values inside the partial range.

2. A method according to claim 1, wherein a respective partial range histogram can contain local and distributed voxels having similar range weights.

3. A method according to claim 1, further comprising selectively applying a trapezoid transfer function to at least one partial range of interest to thereby enhance visualization of a feature in a rendered image.

4. A method according to claim 1, further comprising automatically applying trapezoid transfer functions to the partial range histograms to render the image.

5. A method according to claim 1, further comprising electronically generating a first adaptive color-opacity trapezoid as a transfer function component that adapts center, width and shape to respective partial range histograms.

6. A method according to claim 1, further comprising:

allowing a user to electronically browse detected partial range histograms and select one or more partial range histograms of interest, wherein the partial range histograms include local neighborhoods that have a sufficient number of voxels with intensity values within a defined partial range based on the at least one range weight data value and can include neighborhoods of voxel intensity values outside the partial range and can exclude neighborhoods with voxel intensity values within the partial range; then electronically define a transfer function for the selected one or more partial range histograms to generate the rendered image.

7. A method according to claim 1, further comprising automatically detecting peak characteristics in the partial range histograms and merging selected partial range histograms having similar peak characteristics to define merged partial range histograms.

8. A method of evaluating data associated with direct volume renderings, comprising:

electronically subdividing a volume rendering data set into neighborhoods with local intensity voxel/pixel histograms;

allowing a user to electronically select a partial range of interest in the volume data set;

automatically electronically analyzing a plurality of the local histograms;

programmatically generating a partial range histogram using the user-selected partial range of interest and at least one range weight value, wherein the partial range histogram includes local neighborhoods that have a sufficient number of voxels with intensity values within the user-selected partial range and wherein the partial range histogram can (a) include local neighborhoods with voxel/pixel intensity values outside the partial range and (b) exclude local neighborhoods with voxel/pixel intensity values inside the partial range;

applying an adaptive trapezoid transfer function to the partial range histogram; and electronically visually emphasizing tissue in a rendering in response to the application of the adaptive trapezoid.

9. A method of evaluating data associated with direct volume renderings, comprising:

electronically subdividing a volume rendering data set into neighborhoods with local histograms;

automatically electronically analyzing a plurality of the local histograms;

programmatically distinguishing different materials with overlapping intensity values using at least one range weight data value, wherein the at least one range weight data value is derived as the portion of the pixel or voxel intensity values in the local histogram being within a predefined partial range wherein the at least one range weight data value is used to electronically establish whether a sufficient portion of each local histogram is within a defined partial range, and wherein the programmatically distinguishing step uses the at least one range weight data value to determine whether a particular type of material is associated with different neighborhoods having at least some intensity values inside the defined partial range such that the material can be (a) associated with some of the neighborhoods having less than all of the intensity values inside the partial range with a range weight data value below 100% but above a threshold value and (b) not associated with some of the neighborhoods having some of the intensity values inside the partial range with a range weight data value above 0% but below a threshold value;

generating at least one of a visualization attribute or visualization parameters for the pixels or voxels based on the range weight analysis of local neighborhoods used in the programmatically distinguishing step; and rendering an image with the programmatically distinguished different materials using at least one of the generated visualization attribute or the generated visualization parameters, wherein the analyzing step comprises electronically allocating each local histogram to one of a plurality of partial range histograms based on whether a respective local neighborhood meets a threshold of the at least one range weight data value, wherein the partial range histograms include local neighborhoods that have a sufficient number of voxels with intensity values within a defined partial range and can include neighborhoods with voxel intensity values outside the partial range and can exclude neighborhoods with voxel intensity values within the partial range.

10. A method according to claim 9, wherein the electronically allocating is based on detected peak characteristics of voxel data in the local histograms.

11. A method of evaluating data associated with direct volume renderings, comprising:

electronically subdividing a volume rendering data set into neighborhoods with local histograms, wherein the volume rendering data set comprises MM data with an uncalibrated intensity scale;

automatically electronically analyzing a plurality of the local histograms;

programmatically distinguishing different materials with overlapping intensity values using at least one range weight data value, wherein the at least one range weight data value is derived as the portion of the pixel or voxel intensity values in the local histogram being within a predefined partial range wherein the at least one range weight data value is used to electronically establish whether a sufficient portion of each local histogram is within a defined partial range, and wherein the programmatically distinguishing step uses the at least one range weight data value to determine whether a particular type of material is associated with different neighborhoods having at least some intensity values inside the defined partial range such that the material can be (a) associated with some of the neighborhoods having less than all of the intensity values inside the partial range with a range weight data value below 100% but above a threshold value and (b) not associated with some of the neighborhoods having some of the intensity values inside the partial range with a range weight data value above 0% but below a threshold value; and generating at least one of a visualization attribute or visualization parameters for the pixels or voxels based on the range weight analysis of local neighborhoods used in the programmatically distinguishing step; and rendering an image with the programmatically distinguished different materials using at least one of the generated visualization attribute or the generated visualization parameters, wherein the MRI data comprises MR angiography (MRA) data, and wherein the method further comprises adapting a transfer function to allow relatively precise manual diameter measurements of the aortic diameter using data from partial range histograms, wherein the partial range histograms are populated based on the range weight data values and can include local neighborhoods that have a sufficient number of voxels with intensity values within a defined partial range and can include local neighborhoods with voxel intensity values outside the partial range and can exclude local neighborhoods with voxel intensity values within the partial range.

12. A method according to claim 11, further comprising automatically detecting a contrast agent in the MRA data and automatically adjusting parameters for volume rendering of the MRA angiography data set.

13. A method of evaluating data associated with direct volume renderings, comprising:

electronically subdividing a volume rendering data set into local histograms;

automatically electronically analyzing a plurality of the local histograms;

programmatically distinguishing different materials with overlapping intensity values using range weight data values obtained from the electronic analysis of the local histograms, wherein the range weight data values are used to electronically establish whether a sufficient portion of each local histogram is within a defined partial range;

rendering an image with the programmatically distinguished different materials;

electronically defining partial range histograms based on identified peak characteristics in the local histograms, wherein the partial range histograms include local neighborhoods that have a sufficient number of voxels with intensity values within a the defined partial range and can include neighborhoods with voxel intensity values outside the defined partial range;

fitting a respective Gaussian curve to each of the partial range histograms; and generating adaptive trapezoidal transfer functions, one for each of the Gaussian curves of the partial range histograms.

14. A method of evaluating data associated with direct volume renderings, comprising:

electronically subdividing a volume rendering data set into neighborhoods with local histograms;

automatically electronically analyzing a plurality of the local histograms;

programmatically distinguishing different materials with overlapping intensity values using at least one range weight data value, wherein the at least one range weight data value is derived as the portion of the pixel or voxel intensity values in the local histogram being within a predefined partial range wherein the at least one range weight data value is used to electronically establish whether a sufficient portion of each local histogram is within a defined partial range, and wherein the programmatically distinguishing step uses the at least one range weight data value to determine whether a particular type of material is associated with different neighborhoods having at least some intensity values inside the defined partial range such that the material can be (a) associated with some of the neighborhoods having less than all of the intensity values inside the partial range with a range weight data value below 100% but above a threshold value and (b) not associated with some of the neighborhoods having some of the intensity values inside the partial range with a range weight data value above 0% but below a threshold value;

generating at least one of a visualization attribute or visualization parameters for the pixels or voxels based on the range weight analysis of local neighborhoods used in the programmatically distinguishing step;

rendering an image with the programmatically distinguished different materials using at least one of the generated visualization attribute or the generated visualization parameters; and adapting at least one a priori transfer function to evaluate different volume rendering data sets of similar examination types using programmatically generated partial range histograms of the local histogram data, wherein the partial range histograms are generated using the at least one range weight data value and include local neighborhoods that have a sufficient number of voxels with intensity values within a defined partial range and can include neighborhoods with voxel intensity values outside the partial range and can exclude neighborhoods with voxel intensity values inside the partial range.

15. A method for providing a tissue exploration tool to allow a physician to interactively analyze medical volume data sets in a visualization system, comprising:

allowing a user to electronically select a partial range of interest in an intensity scale of voxel data to thereby allow the user to interactively investigate voxels in a volume rendering data set;

electronically generating a partial range histogram of local neighborhoods that have a sufficient number of voxels with intensity values within the selected partial range as defined by a range weight and can: (i) include local neighborhoods of voxel intensity values outside the selected partial range and (ii) exclude local neighborhoods with voxel intensity values inside the selected partial range;

electronically fitting an adaptive trapezoid to the partial range histogram; and electronically rendering an image of material associated with the selected partial range and adaptive trapezoid.

16. A method according to claim 15, further comprising displaying a graphic interface that allows a user to electronically slide a partial range bar over a global histogram in the intensity scale, wherein the partial range histogram is generated using range weight data values of voxels in local neighborhoods that can be distributed through a volume.

17. A method for visualizing images of volume data sets, comprising:

iteratively electronically subdividing a respective volume data set using local histograms of neighborhood voxel data to allocate the neighborhoods of data into partial range histograms, each partial range histogram includes neighborhoods of data having a sufficient number of voxels with intensity values in a defined range as defined by a range weight, and wherein a respective partial range histogram can include neighborhoods with voxel intensity values outside the defined range and can exclude neighborhoods with voxel intensity values inside the defined range;

electronically automatically identifying different materials in the volume data set based on the partial range histograms, including materials having overlapping image intensity values which may be distributed over a target volume of interest; and electronically rendering an image of the identified different materials in the volume data set to a display.

18. A method according to claim 17, wherein the local neighborhoods are selected, configured and sized so that the volume data set can be analyzed with non-overlapping subdivision of the voxel data, wherein a respective partial range histogram can include local neighborhoods that are distributed throughout the volume data set.

19. A method according to claim 17, wherein the range weight is derived using the equation:

$$w_r(\Phi, N) = \frac{|N \cap V_\Phi|}{|N|},$$

where N is an arbitrary voxel neighborhood, $V_\Phi$ is the set of voxels within a range $\Phi$ and $|V|$ denotes the number of voxels in a set V.

20. A system for generating DVR medical images, comprising:

a volume rendering medical image processor system with an electronic circuit configured to generate data for a diagnostic medical image of a target region of a patient by electronically subdividing a volume rendering data set using local histogram analysis to define a partial range histogram formed with a composite set of neighborhoods having a sufficient number of voxels or pixels with intensity values in a partial range as defined by a range weight, and wherein the partial range histogram can include local histograms with voxels or pixels outside the partial range and can exclude local histograms with voxels or pixels inside the partial range, and wherein the neighborhoods associated with the partial range histogram can be distributed through the volume rendering data set to separate different tissues with overlapping image intensity values.

21. A system according to claim 20, wherein the processor system is configured to analyze the partial range histograms and peak characteristics and intensity values associated with the local histogram voxels to electronically automatically identify different tissue with overlapping image intensity values.

22. A system according to claim 20, wherein the processor system is configured to programmatically perform at least one of: (a) classify and (b) detect tissues in the volume data set using data from the local histogram analysis.

23. computer readable storage medium having computer readable program code embodied in the medium, the computer-readable program code comprising:

computer readable program code configured to generate partial range histograms having associated peak characteristics and intensity values to electronically identify different types of tissue having overlapping image intensity values, the partial range histograms comprising local neighborhoods of voxel intensity data that have a sufficient number of voxels with intensity values within the partial range as defined by a range weight, wherein the partial range histograms can include local neighborhoods with voxel intensity values outside the partial range and can exclude local neighborhoods with voxel intensity values inside the partial range; and computer readable program code configured to render a diagnostic medical image of different materials in a target region of a patient using data from the partial range histograms.

24. A computer readable storage medium according to claim 23, further comprising computer readable program code configured to define at least one range weight, wherein the computer readable program code that generates the partial range histograms is configured to use the at least one defined range weight to determine if a local neighborhood should be included or excluded from a respective partial range histogram.

* * * * *

UNITED STATES PATENT AND TRADEMARK OFFICE
CERTIFICATE OF CORRECTION

PATENT NO. : 7,532,214 B2
APPLICATION NO. : 11/137160
DATED : May 12, 2009
INVENTOR(S) : Lundström It is certified that error appears in the above-identified patent and that said Letters Patent is hereby corrected as shown below:

Title Page 2, Right Column, Kindlemann, G. et al.:
Please correct "Kindlemann" to read -- Kindlmann --

Title Page 2, Right Column, Lundstrom et al:
Please correct "Functin" to read -- Function --

Column 23, Claim 11, Line 23: Please correct "MM" to read -- MRI --

Column 26, Claim 23, Line 39: According to Examiner's Amendment please correct "computer readable" to read -- A computer readable --

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,532,214 B2 Page 1 of 1
APPLICATION NO. : 11/137160
DATED : May 12, 2009
INVENTOR(S) : Lundström It is certified that error appears in the above-identified patent and that said Letters Patent is hereby corrected as shown below:

Title Page 1, (73) Assignee:
Please correct "Spectra AB" to read -- Sectra AB --

Signed and Sealed this

Fourth Day of May, 2010

David J. Kappos
*Director of the United States Patent and Trademark Office*